United States Patent
Farca et al.

(10) Patent No.: US 9,689,643 B2
(45) Date of Patent: Jun. 27, 2017

(54) OPTICAL DEVICE UTILIZING BALLISTIC ZOOM AND METHODS FOR SIGHTING A TARGET

(71) Applicant: Burris Company, Inc., Greeley, CO (US)

(72) Inventors: George Farca, Golden, CO (US); Steven A. Bennetts, Greeley, CO (US); James A. Millett, Huntington Beach, CA (US)

(73) Assignee: BURRIS COMPANY, INC., Greeley, CO (US)

( * ) Notice: Subject to any disclaimer, the term of this patent is extended or adjusted under 35 U.S.C. 154(b) by 0 days.

(21) Appl. No.: 15/012,630

(22) Filed: Feb. 1, 2016

(65) Prior Publication Data

US 2017/0108311 A1   Apr. 20, 2017

Related U.S. Application Data

(60) Division of application No. 14/175,803, filed on Feb. 7, 2014, now Pat. No. 9,250,036, which is a continuation-in-part of application No. 13/786,383, filed on Mar. 5, 2013, now Pat. No. 8,881,981, which is a continuation-in-part of application No.
(Continued)

(51) Int. Cl.
| | | |
|---|---|---|
| *G06G 7/80* | (2006.01) | |
| *F41G 1/473* | (2006.01) | |
| *F41G 1/38* | (2006.01) | |
| *F41G 3/06* | (2006.01) | |

(52) U.S. Cl.
CPC ............. *F41G 1/473* (2013.01); *F41G 1/38* (2013.01); *F41G 3/06* (2013.01)

(58) Field of Classification Search
USPC ........................................................ 235/404
See application file for complete search history.

(56) References Cited

U.S. PATENT DOCUMENTS

| 722,910 A | 3/1903 | Saegmuller |
| 2,381,101 A | 8/1945 | Bausch |
| 3,153,856 A | 10/1964 | Felix |

(Continued)

FOREIGN PATENT DOCUMENTS

| CN | 201145779 Y | 11/2008 |
| CN | 201378019 | 1/2010 |

(Continued)

OTHER PUBLICATIONS

PCT International Search Report and Written Opinion for Application No. PCT/US2015/014424 mailed Oct. 16, 2015, 12 pgs.

*Primary Examiner* — Jamara Franklin

(57) ABSTRACT

A method of sighting a target includes receiving an initial condition of an optical device. The initial condition includes a size of a ranging element and a range associated with the size of the ranging element. The method further includes receiving a ballistic information and receiving an image from an imaging sensor. At least a portion of the image is displayed on a display. The ranging element is overlaid on the displayed portion of the image. A first zoom input is received to set a first zoom value that corresponds to a first distance from the optical device. The method also includes determining a first projectile position based on the first distance and the ballistic information.

12 Claims, 20 Drawing Sheets

Related U.S. Application Data

13/412,506, filed on Mar. 5, 2012, now Pat. No. 8,807,430.

(56) References Cited

U.S. PATENT DOCUMENTS

| | | |
|---|---|---|
| 3,183,594 A | 5/1965 | Panunzi |
| 3,315,362 A | 4/1967 | Palmer |
| 3,611,606 A | 10/1971 | Sefried et al. |
| 3,669,523 A | 6/1972 | Edwards |
| D234,539 S | 3/1975 | Marchetti |
| D234,540 S | 3/1975 | Marchetti |
| 3,877,166 A | 4/1975 | Ward |
| 3,994,597 A | 11/1976 | Calder et al. |
| 4,264,123 A | 4/1981 | Mabie |
| 4,523,818 A | 6/1985 | Lang et al. |
| 4,531,052 A | 7/1985 | Moore |
| 4,571,870 A | 2/1986 | Heideman et al. |
| 4,630,903 A | 12/1986 | Jones |
| 4,643,542 A | 2/1987 | Gibson |
| 4,695,161 A | 9/1987 | Reed |
| 4,777,754 A | 10/1988 | Reynolds, Jr. |
| 4,845,871 A | 7/1989 | Swan |
| 5,343,744 A | 9/1994 | Ammann |
| 5,400,540 A | 3/1995 | Solinsky et al. |
| 5,408,359 A | 4/1995 | Ferrett et al. |
| 5,426,880 A | 6/1995 | Ruger et al. |
| 5,430,967 A | 7/1995 | Woodman, III et al. |
| 5,506,727 A | 4/1996 | Douglas et al. |
| 5,584,137 A | 12/1996 | Teetzel |
| 5,771,623 A | 6/1998 | Pernstich et al. |
| 5,783,745 A | 7/1998 | Bergman |
| 5,784,207 A | 7/1998 | Satoh |
| 5,920,995 A | 7/1999 | Sammut |
| 5,941,489 A | 8/1999 | Fanelli et al. |
| 5,973,315 A | 10/1999 | Saldana et al. |
| 6,032,374 A | 3/2000 | Sammut |
| 6,185,854 B1 | 2/2001 | Solinsky et al. |
| 6,269,581 B1 | 8/2001 | Groh |
| 6,363,223 B1 | 3/2002 | Gordon |
| 6,442,883 B1 | 9/2002 | Waterman et al. |
| 6,453,595 B1 | 9/2002 | Sammut |
| 6,516,551 B2 | 2/2003 | Gaber |
| 6,516,699 B2 | 2/2003 | Sammut et al. |
| 6,574,901 B1 | 6/2003 | Solinsky et al. |
| 6,580,555 B2 | 6/2003 | Crista |
| 6,580,876 B1 | 6/2003 | Gordon |
| 6,606,813 B1 | 8/2003 | Squire et al. |
| 6,608,298 B2 | 8/2003 | Gaber |
| 6,615,531 B1 | 9/2003 | Holmberg |
| 6,681,512 B2 | 1/2004 | Sammut |
| 6,721,095 B2 | 4/2004 | Huber |
| 6,729,062 B2 | 5/2004 | Thomas et al. |
| 6,792,206 B2 | 9/2004 | Gordon |
| 6,807,742 B2 | 10/2004 | Schick et al. |
| 6,813,025 B2 | 11/2004 | Edwards |
| 6,819,495 B2 | 11/2004 | Shani et al. |
| 6,862,832 B2 | 3/2005 | Barrett |
| 7,125,126 B2 | 10/2006 | Yamamoto |
| 7,129,857 B1 | 10/2006 | Spirkovska |
| 7,292,262 B2 | 11/2007 | Towery et al. |
| 7,317,520 B2 | 1/2008 | Wang et al. |
| 7,343,707 B2 | 3/2008 | Smith, III |
| 7,656,579 B1 | 2/2010 | Millett |
| 7,703,679 B1 | 4/2010 | Bennetts et al. |
| 7,905,046 B2 * | 3/2011 | Smith, III ............... F41G 1/38 235/404 |
| 8,201,741 B2 | 6/2012 | Bennetts et al. |
| 8,353,454 B2 | 1/2013 | Sammut et al. |
| 8,919,650 B2 | 12/2014 | Browe et al. |
| 9,250,036 B2 | 2/2016 | Farca et al. |
| 2002/0089752 A1 | 7/2002 | Morgan, III |
| 2003/0010190 A1 | 1/2003 | Sammut et al. |
| 2003/0163278 A1 | 8/2003 | Clark et al. |
| 2004/0047586 A1 | 3/2004 | Schick et al. |
| 2004/0068913 A1 | 4/2004 | Solinsky et al. |
| 2004/0082888 A1 | 4/2004 | Palazzolo et al. |
| 2004/0088898 A1 | 5/2004 | Barrett |
| 2004/0144013 A1 | 7/2004 | Leatherwood |
| 2004/0187374 A2 | 9/2004 | Solinsky et al. |
| 2004/0231220 A1 | 11/2004 | McCormick |
| 2004/0234812 A1 | 11/2004 | Naito et al. |
| 2005/0002668 A1 | 1/2005 | Gordon |
| 2005/0021282 A1 | 1/2005 | Sammut et al. |
| 2005/0036109 A1 | 2/2005 | Blum et al. |
| 2005/0200959 A1 | 9/2005 | Yamamoto |
| 2005/0219690 A1 | 10/2005 | Lin et al. |
| 2005/0252062 A1 | 11/2005 | Scrogin et al. |
| 2005/0263688 A1 | 12/2005 | Kauhanen |
| 2005/0268521 A1 | 12/2005 | Cox et al. |
| 2006/0010760 A1 | 1/2006 | Perkins et al. |
| 2006/0162226 A1 | 7/2006 | Tai |
| 2006/0164704 A1 | 7/2006 | Sieczka et al. |
| 2006/0187562 A1 | 8/2006 | Mounnarat et al. |
| 2007/0035824 A1 | 2/2007 | Scholz |
| 2007/0086893 A1 | 4/2007 | Pedersen |
| 2007/0097351 A1 | 5/2007 | York et al. |
| 2007/0234626 A1 | 10/2007 | Murdock et al. |
| 2007/0277421 A1 | 12/2007 | Perkins et al. |
| 2008/0140331 A1 | 6/2008 | Kalinin |
| 2008/0186568 A1 | 8/2008 | Chen et al. |
| 2009/0266892 A1 | 10/2009 | Windauer et al. |
| 2011/0075125 A1 | 3/2011 | Kanayama |
| 2011/0099881 A1 | 5/2011 | Jung et al. |
| 2012/0044475 A1 | 2/2012 | Yang et al. |
| 2012/0048931 A1 | 3/2012 | Arbouw |
| 2012/0097741 A1 | 4/2012 | Karcher |
| 2012/0182417 A1 | 7/2012 | Everett |
| 2012/0186130 A1 | 7/2012 | Tubb |
| 2012/0298750 A1 | 11/2012 | McCarty et al. |
| 2013/0033746 A1 | 2/2013 | Brumfield |
| 2013/0040268 A1 | 2/2013 | Van Der Walt et al. |
| 2013/0047485 A1 | 2/2013 | Tubb |
| 2013/0170027 A1 | 7/2013 | Peters et al. |
| 2013/0188180 A1 | 7/2013 | Jakob |
| 2013/0199074 A1 | 8/2013 | Paterson et al. |
| 2013/0206836 A1 | 8/2013 | Paterson et al. |
| 2013/0228616 A1 | 9/2013 | Bhosle et al. |
| 2013/0228618 A1 | 9/2013 | Millett |
| 2014/0059915 A1 | 3/2014 | Sammut et al. |
| 2014/0319215 A1 | 10/2014 | Farca et al. |
| 2015/0002856 A1 | 1/2015 | McCarthy et al. |
| 2016/0025455 A1 | 1/2016 | Paterson et al. |

FOREIGN PATENT DOCUMENTS

| | | |
|---|---|---|
| CN | 101706232 A | 5/2010 |
| CN | 201740465 U | 2/2011 |
| CN | 201844750 U | 5/2011 |
| DE | 102011018947 | 10/2012 |
| WO | WO 00/50836 | 8/2000 |
| WO | WO 03/096216 | 11/2003 |
| WO | 2010/134738 | 11/2010 |

* cited by examiner

OPTICAL DEVICE UTILIZING BALLISTIC ZOOM AND METHODS FOR SIGHTING A TARGET

CROSS-REFERENCE TO RELATED APPLICATIONS

This application is a divisional of U.S. patent application Ser. No. 14/175,803, filed Feb. 7, 2014, which is a continuation-in-part of U.S. patent application Ser. No. 13/786,383, filed Mar. 5, 2013, and entitled "Digital Targeting Scope Apparatus," which is a continuation-in-part of U.S. Non-Provisional application Ser. No. 13/412,506, filed Mar. 5, 2012, entitled "Dscope Aiming Device," the disclosures of which are hereby incorporated by reference herein in their entireties.

INTRODUCTION

When making a long range shot with a firearm, the shooter must first determine a firing solution based on distance to target (Range), bullet drop due to the flight characteristic of the bullet and gravity (Drop), and crosswind component of the wind that is blowing at the time of firing (Windage).

Typically, the shooter will have a chart taped to the side of his weapon, or will have memorized the values for each of the corrections i.e. Drop and Windage at various Ranges and wind velocities. The shooter must then make a correction for each of these component values. Two methods are commonly used for this purpose. The first is to manually adjust the turrets on an optical aiming device so that the reticle is directing the shooter to the corrected target position. The second alternative is to use what is commonly called "Holdover" by those skilled in the art. There are many types of optical aiming devices that have graduated reticles for this purpose. The shooter places the target at a different position on the reticle based on its graduations.

There are numerous "Optical solutions" to the "Automatic Firing solution" problem cited in previous patents; however, few seldom survive in the marketplace because of the high cost of automatically moving optical components and the difficulty of maintaining accuracy with repeated impact from a weapon.

SUMMARY

A first embodiment of the targeting device or apparatus in accordance with the present disclosure includes an image sensor and a lens for acquiring video images of objects at which the aiming device is aimed; an image processor; a tilt sensor for sensing the force of gravity in relation to the aiming device; a display component for displaying the video images captured by the image sensor, and processed by the image processor; a eyepiece lens to allow the user to view the display component; a pressure and temperature sensor to sense atmospheric conditions, and suitable means to house said components.

The apparatus provides a completely "Solid state digital" and "Hands Free" solution to the task of accurately firing a weapon at long range. The shooter is able to input all of the necessary information to make a long range shot at the time of firing without removing his hands from the weapon, by simply tilting the weapon from side to side.

A predetermined threshold angle defines the tilt function. For purposes of explanation, let us say this is 10 degrees. If the tilt angle of the weapon is less than 10 degrees in either direction i.e. left or right, a calculation is made for cross-windage adjustment. A representation of the amount of cross-windage adjusted for, is superimposed; along with a suitable crosshair symbol to define aim point, on a video image presented to the shooter. If the tilt angle is greater than 10 degrees in either direction, a range number superimposed on the video image, is progressively increased or decreased dependent on the direction and magnitude of the tilt angle greater than 10 degrees. The field of view i.e. (the magnification power) of the video image presented to the shooter is simultaneously increased or decreased in relation to the Range number, if the field of view is within field of view limits defined by the front lens and the image sensor.

A Range finding circle is also superimposed on the video image. This circle represents a predetermined target size. The circle remains a fixed size on the display component, if the field of view is greater than its minimum. If the field of view is at minimum, the Range finding circle size is progressively adjusted to a smaller size in relation to the Range setting. To find the distance to target, the shooter adjusts the range setting by tilting the weapon more than 10 degrees left or right until the target fits the range finding circle.

As described above, the apparatus provides a durable aiming device with no visible external controls. All ballistic calculations necessary for long-range shooting are performed automatically in relation to internal sensors and settings performed by tilting the weapon; thereby, rendering a simple and easy to use aiming device.

Another embodiment in accordance with the present disclosure is a digital targeting scope apparatus that includes a tubular housing having a central axis and a first end and a second end and an interchangeable digital camera module carried by the first end of the housing. The camera module includes at least one focusing lens axially spaced from an image sensor mounted normal to a lens axis on a sensor circuit board within the camera module. An image projected by the lens focuses at a predetermined location on the sensor. A control/display module having a longitudinal axis is removably fastened to the second end of the housing. The control/display module is electrically connected to the camera module through a connector on the sensor circuit board of the camera module. Connection is made when the control/display module is installed in the second end of the housing. The control/display module has a control portion including a circuit board and a display component mounted thereon and includes a display portion housing an eyepiece lens assembly aligned with the display component.

The control portion of the control/display module preferably has a power source, a tilt sensor, an external computer connector, an image processor, a memory and a pair of switches all connected to a printed circuit on a printed circuit board oriented axially in the control/display module. The camera module and control/display module are coaxially aligned in the tubular housing. The control/display module is configured to permit a user to select between settable preprogrammed parameters when the control/display module is separated from the camera module and rotated about its longitudinal axis. The selection of one or more of the preprogrammed parameters is made by actuation of one or more of the pair of switches.

A tilt sensor in the control/display module is configured to measure a tilt angle of the device about the housing axis and cause the image processor to produce an adjusted target image in response to the measured tilt angle. The image processor is configured to generate a change in display image field of view upon receipt from the tilt sensor of a measured tilt angle greater than a threshold angle. A tilt angle greater than zero and less than the threshold angle causes a windage adjustment indicator in the display image field of view to change position.

The control/display module is configured to permit a user to select between settable preprogrammed parameters when the control/display module is separated from the camera module and horizontally held and rotated about its longitudinal axis.

In one aspect, the technology relates to a method of sighting a target, the method including: receiving an initial condition of an optical device, wherein the initial condition includes a size of a ranging element and a range associated with the size of the ranging element; receiving a ballistic information; receiving an image from an imaging sensor; displaying at least a portion of the image on a display; overlaying the ranging element on the displayed portion of the image; receiving a first zoom input to set a first zoom value, wherein the first zoom value corresponds to a first distance from the optical device; and determining a first projectile position based on the first distance and the ballistic information. In an embodiment, the method further includes displaying a first region of interest based at least in part on the first projectile position and the first zoom value. In another embodiment, the method further includes displaying a first symbol corresponding to the first projectile position. In yet another embodiment, the method further includes: receiving a maximum zoom input to set a maximum zoom value, wherein the maximum zoom value is defined by an image sensor region of interest and a display region of interest; displaying a maximally magnified image associated with the maximum zoom value; receiving a second zoom input to set a second zoom value, wherein the second zoom value corresponds to a second distance from the optical device; calculating a size of an adjusted ranging element; superimposing the adjusted ranging element on the displayed maximally magnified image; determining a second projectile position based on the second distance and the ballistic information; and displaying a second region of interest based at least in part on the second projectile position and the second zoom value. In still another embodiment, the method further includes displaying a second symbol corresponding to the second projectile position.

In another embodiment of the above aspect, the first symbol has at least one of a point of impact at the target and a guide symbol. In an embodiment, the first projectile position determination operation is based at least in part on a crosswind input. In another embodiment, the first projectile position determination operation is based at least in part on a projectile information input, an ambient temperature input, an inclination input, a tilt input, a muzzle exit velocity input, and a barometric pressure input. In yet another embodiment, the imaging sensor has a camera.

In another aspect, the technology relates to a method of sighting a target, the method including: receiving a ballistic information; receiving an image from an imaging sensor; receiving a zoom value; calculating a projectile trajectory based at least in part on the ballistic information; and displaying a region of interest based on the zoom value, wherein the region of interest corresponds at least in part to the projectile trajectory. In an embodiment, the method further includes determining a range to the target. In another embodiment, the determination operation includes: displaying at least a portion of the image on a display; and superimposing a ranging element on the portion of the image. In yet another embodiment, the method further includes: receiving a zoom input, wherein the zoom input has an updated zoom value; and displaying an updated region of interest based on the updated zoom value.

In yet another aspect, the technology relates to a method of sighting a target, the method includes: receiving an image from an image sensor; displaying at least a portion of the received image, wherein the displayed portion has a displayed field of view; displaying a ranging element with a fixed size in relation to the displayed field of view; receiving a target size input; receiving a zoom input to set a zoom value; calculating a range to a target based at least in part on the target size input and the zoom value. In an embodiment, the target size input has a default target size input. In another embodiment, the receiving target size input includes receiving the target size input from a storage device. In yet another embodiment, the target size input is selected from a plurality of predetermined target sizes.

In still another aspect, the technology relates to an apparatus for sighting a target, the apparatus includes: a housing; a display; an imaging sensor; and a controller configured to selectively operate the apparatus in a default zoom mode and a ballistic zoom mode, wherein when in the default zoom mode, an increase in a zoom level changes a field of view along an optical path from the apparatus to the target, and wherein when in the ballistic zoom mode, the increase in the zoom level changes the field of view along a ballistic path from the apparatus. In an embodiment, wherein in the default zoom mode, a symbol associated with a projectile point of impact is displayed on the display, wherein a position of the symbol on the display changes based on the zoom level.

BRIEF DESCRIPTION OF THE DRAWINGS

Other features and advantages of the present technology, as well as the technology itself, can be more fully understood from the following description of the various embodiments, when read together with the accompanying drawings, in which.

DETAILED DESCRIPTION

Reference will now be made in detail to the accompanying drawings, which at least assist in illustrating pertinent embodiments of the new technology provided for by the present disclosure.

Figure 1:
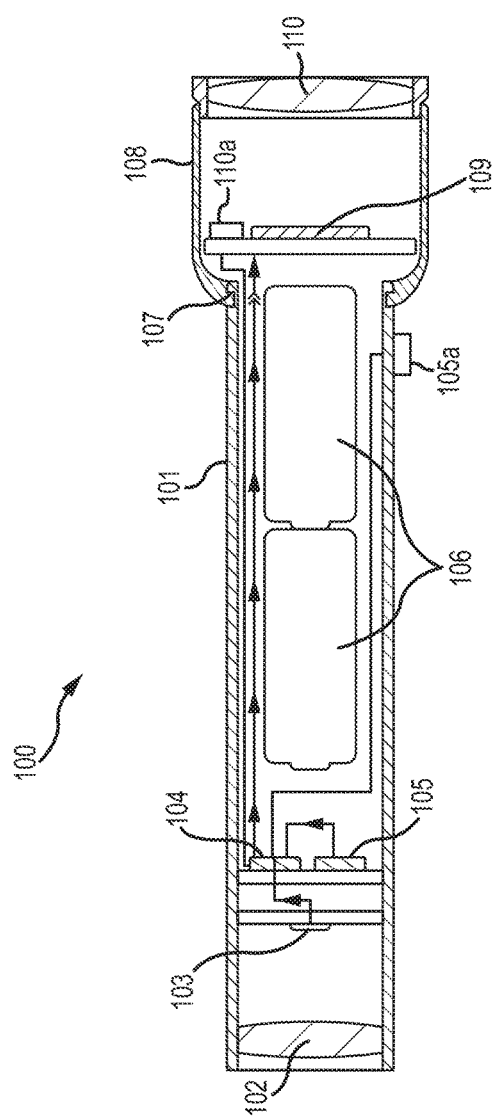
FIG. 1 is a partial, cross-sectional, schematic view of one embodiment of a digital targeting scope in accordance with the present disclosure.

Referring now to FIG. 1, one embodiment of a digital targeting scope system 100 is illustrated. In the illustrated embodiment, the system 100 includes an elongated, hollow, tubular housing 101 having a front end and rear end. The housing may be fabricated from anodized aluminum or the like. A front lens 102 and an image sensor 103 are mounted proximal the front end of the housing 101. The front lens 102 is mounted so as to focus light from a target onto the image sensor 103. An image processor 104, a tilt sensor 105, and batteries 106 are mounted within the tubular housing 101. The image sensor 103 and tilt sensor 105 are in electrical communication with the image processor 104. A control/display module 108 and an image display component 109 are mounted proximal the rear end of the housing 101. The image display component 109 is in electrical communication with the image processor 104. The housing 101 may also include an integral mounting system (not pictured) for the purpose of mounting the aiming device 100 to a weapon (e.g., a rifle).

In this exemplary embodiment, the image sensor 103 is operable to obtain raw image data of the target. The image processor 104 is operable to receive the raw image data from the image sensor 103 and produce a target image based thereon. The image display component 109 is operable to receive the target image from the image processor 104 and display the target image to a user, which may facilitate aiming of the weapon.

The tilt sensor 105 is operable to measure the tilt angle of the aiming device 100 and produce angular position data based thereon. As used herein, "tilt angle" means the rotational orientation of the aiming device 100 about the center axis of the tubular housing 101. Tilt angle is expressed as the amount, in degrees, of rotational displacement (i.e., angular displacement) of the device while positioned on a horizontal axis through the device from a reference orientation (e.g., vertical). In one embodiment, the tilt sensor is an accelerometer. An eye sensor 110a disposed proximate the ocular lens 110 and in operable communication with the processor 104 may also be utilized as described herein.

The image processor 104 preferably includes a microprocessor and memory storing static information and dynamic information, along with software that is operable to receive the angular position data from the tilt sensor 105 and make adjustments to the target image display based thereon. Thus, changing the tilt angle, for example via a clockwise/counterclockwise rotation of a weapon attached to the aiming device 100, while the weapon is pointed or aimed along an axis through the weapon's barrel, may facilitate control of one or more aiming functions associated with the device. In alternative embodiments, this control and adjustment functionality of the tilt sensor may be replaced with or supplemented by a button 105a, switch, knob, or other implement.

The static information stored in the image processor 104 memory includes coordinates of the optical focal point location on the image sensor 103. Since the image sensor 103 is a two dimensional array of photosites known as pixels, the x-y coordinates of the focal point of the lens on the array defines the reference position of the center of the image for display. These coordinates are burned into non-volatile memory of the image sensor In the illustrated embodiment of FIGS. 1 and 2, changing the tilt angle may control such aiming functions as field of view adjustment, drop correction, and/or windage correction. A threshold tilt angle may define the separate functions of the aiming device 100. In one embodiment, the user may control the field of view (i.e., the effective magnification) of the target image displayed by applying a tilt angle greater than the threshold angle to the aiming device 100. When the tilt sensor 105 senses that the tilt angle is greater than threshold angle in either direction, the image processor 104 may respond by adjusting the field of view. Whether the field of view is increased or decreased, and the rate at which it does so, may depend on the direction and magnitude of the tilt angle.

In one embodiment, the threshold tilt angle is 10 degrees. Thus, applying a tilt angle of 30 degrees to the right (i.e., clockwise) may cause the field of view to rapidly decrease (i.e., increasing the magnification power), thereby rapidly causing the objects in the target image to appear larger to the user. Conversely, applying a tilt angle of 15 degrees to the left (i.e., counterclockwise) may cause the field of view to slowly increase (i.e., decreasing the magnification power), thereby slowly causing the objects in the target image to appear smaller to the user.

The field of view of the target image may have limits determined by the resolution of the image sensor 103 and the resolution of the image display component 109. For example the image sensor 103 may have a resolution of 2560×1920 pixels and the image display component 109 may have a resolution of 320×240 pixels. The minimum field of view of the target image (i.e., maximum magnification) may thus be reached when the data from one pixel on the image sensor 103 controls the output of one pixel on the image display component 109. Thus at maximum magnification in the present example, the image display component 109 may display one eighth of the data collected by the image sensor 103. The maximum field of view of the target image (i.e., minimum magnification) may be reached when the image display component 109, having 320×240 pixels, displays all the data collected by the image sensor 103 having 2560×1920 pixels. Thus at minimum magnification in the present example, data from blocks of pixels collected by the image sensor 103 are combined in a process called "binning" and are then sent to control one pixel on the image display component 109. In order to perform the range finding function with a high degree of resolution, the field of view of the target image must be progressively altered between maximum and minimum in small steps. Thus, the field of view of the image sensor 103 will vary from 2560×1920 pixels to 320×240 pixels in small steps, and the resolution of the image displayed by the image display component 109 will remain fixed at 320×240 pixels. Thus, in one exemplary embodiment, the aiming device has a variable magnification ratio of 8 to 1. Again, one or more buttons 105*a*, knobs, or switches may also perform the adjustments described above in association with the tilt sensor 105.

Figure 2:
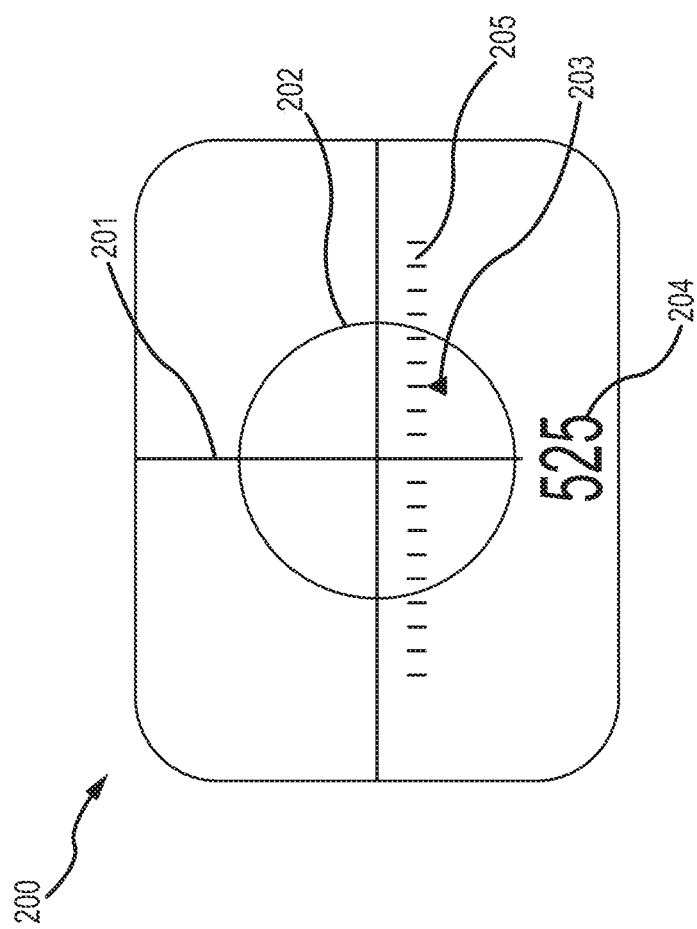
FIG. 2 illustrates one embodiment of a target image overlay of the digital targeting scope of FIG. 1.

Referring now to FIG. 2, one embodiment of a target image overlay 200 is illustrated. The microprocessor 104 may superimpose the target image overlay 200 on the displayed target image. The target image overlay 200 displays information to the user which may facilitate aiming of the weapon. In the illustrated embodiment of FIG. 2, the target image overlay 200 includes crosshairs 201, range circle 202, crosswind correction symbol 203, range number 204, and tick marks 205. The crosshairs 201 are used to define an aiming position within the target image. The range number 204 displays the range. The units of measure of range can be yards or meters selectable by the user. The crosswind correction symbol 203 in conjunction with tick marks 205 indicates the amount of crosswind corrected for in miles per hour or kilometers per hour. With optional English units chosen, the overlay 200, as shown, indicates that a crosswind of 3 miles per hour coming from the right is being corrected for, and a bullet drop calculated for a distance to target of 525 yards is being corrected for.

The illustrated target image overlay 200 includes a ranging element 202. In the depicted embodiment, the ranging element 202 is a range circle, but other element shapes may be utilized. The aiming device 100 may measure the distance to a target (i.e., range) via the "Stadiametric method" using range circle 202. The range circle 202 represents a predetermined target size. To determine the range to the target, the field of view may be adjusted (e.g., by applying a tilt angle of greater than 10 degrees) while the size of the range circle 202 is held constant, until the image of the target appears to completely fill the range circle. Alternatively, if present on the aiming device 100, a button 105*a* may be pressed, a turret rotated, etc. The image processor 104 may then calculate the distance to the target using trigonometry. For example, three points consisting of the visible top of a target, the visible bottom of a target, and the front lens 120 define a right triangle. The distance from the top to the bottom of the target defines a first side of the triangle. The range circle provides a measurement of the angle opposite the first side. Thus the, image processor 104 may calculate for the length of the adjacent side of the triangle, i.e., the distance to the target.

At very long distances to the target, the image of the target may not be large enough to fill the range circle 202 even at maximum magnification (i.e., minimum field of view). Thus, in one embodiment, when maximum magnification has been reached, the image processor 104 may begin to reduce the size of the range circle 202 in response to continued input to reduce the field of view (e.g., continuing to hold the aiming device 100 at an angle beyond the threshold angle). Thus, range finding may be facilitated even at distances beyond the maximum magnification. This process is further described below.

The effect of gravity on a bullet (i.e, bullet drop) may be calculated and corrected for by the image microprocessor 104, based on such variables as the range and ballistic data related to the bullet. The ballistic data may be input and stored in the aiming device 100. Examples of such inputs are described further below with reference to additional exemplary embodiments. To facilitate bullet drop correction, the image processor 104 may shift the target image up relative to the crosshairs 201, based on the calculated bullet drop, thereby causing the shooter to effectively aim at a point above the target although the image will appear to the viewer to be centered about the crosshairs. In other embodiments described below, the image processor 104 may display a region of interest about a projectile at a certain distance from the shooter. The shooter would then be required to raise the weapon so as to align the crosshairs on the target. This action corrects for bullet drop at any point along the projectile path.

The effect of wind on a bullet (i.e, cross-windage) may be calculated and corrected for by the image processor 104, based on such variables as the range, ballistic data, and ambient wind conditions at the time of firing. The ambient wind conditions may be measured or estimated using techniques known in the art. The cross-windage may be input into the image processor 104 by applying an appropriate tilt angle to the aiming device 100. To facilitate cross-windage correction, the image processor 104 may shift the target image horizontally relative to the crosshairs 201, based on the calculated or known cross-windage, thereby causing the shooter to aim at a point upwind of the target. In other embodiments described below, the image processor 104 may display a region of interest about a projectile at a certain distance, based on the cross-windage. The shooter would then be required to move the weapon so as to align the crosshairs on the target. This action corrects for cross-windage at any point along the projectile path.

The user may control the cross-windage correction function by applying a tilt angle of less than the threshold angle to the aiming device 100. The magnitude and direction of the tilt applied to the aiming device 100 may control the magnitude and direction of the cross-windage input, thus controlling the cross-windage correction. For example if the threshold tilt angle is 10 degrees, a tilt angle of 5 degrees to the right (i.e., clockwise) may correspond to a cross-windage correction appropriate to compensate for a 10 mph wind coming from the user's right side. Whereas, a tilt angle of 3 degrees to the left (i.e., counterclockwise) may correspond to an appropriate cross-windage adjustment to compensate for a 7 mph wind coming from the left.

The crosswind correction symbol 203 may facilitate cross-windage correction by allowing the user to more precisely input the cross-windage. The image processor 104 may cause the crosswind correction symbol 203 to slide left and right relative to the crosshairs 201 in response to the magnitude and direction of the tilt angle, thereby indicating to the user the magnitude and direction of the cross-windage input being communicated to the image processor 104.

In addition, the image processor 104 adjusts the left to right position of the displayed target image such that the target remains centered in the crosshairs even though the line of sight of the weapon is corrected for the cross-wind indicated by the correction symbol 203. For example, in the exemplary illustration of FIG. 2, the cross-wind correction symbol 203 indicates a right-to-left cross-windage input of 3 units (e.g., mph) while the weapon barrel alignment (i.e., actual point of aim) is automatically right adjusted for this 3 MPH cross-wind because the display image seen by the shooter is shifted appropriately. Therefore the shooter must maintain this 3 unit tilt while firing the weapon to automatically correct for the cross-wind. In alternate embodiments, the tilt need not be maintained as the shooter may return the firearm to the upright position prior to firing.

In order to initially align the device 100 on a weapon, such as a rifle, first it must be mounted on the weapon and "sighted in" at a known distance. The sequence of operations is outlined in FIG. 19. This procedure is used to compensate the device for mechanical alignment variations with respect to the weapon barrel. A first vertical adjustment is called correction for mechanical "elevation" at a reference distance. Typically for a rifle this is done at a target distance of 100 yards. A second adjustment, to compensate for horizontal variation in mounting is called mechanical "Windage". For the device 100, these adjustments are made in software resident on an external device such as a laptop, iPad, smartphone or PC that is connected to the microprocessor 104 in the device 100.

Figure 19:
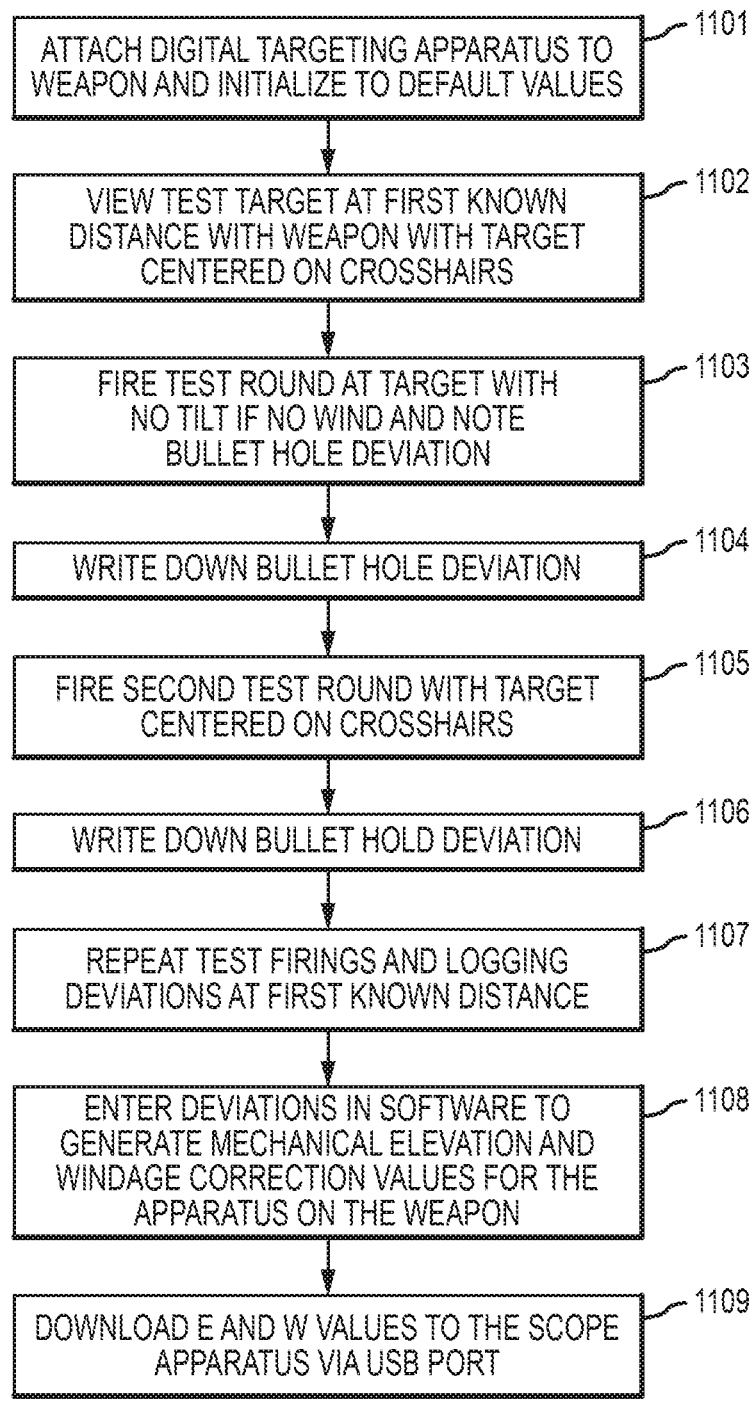
FIG. 19 illustrates the process of initially aligning or sighting in the apparatuses shown in FIG. 1 and in FIG. 3 on a weapon such as a rifle.

Initially default values assuming perfect barrel alignment, and an expected muzzle velocity (MV) value and expected ballistic coefficient (BC) are loaded as defaults in the device 100, shown as operational step 1101 in FIG. 19. Next, the weapon is taken to a target range where a target is placed at a known distance, for example, 100 yards, and the device 100 is aimed at that target in operation 1102. Preferably this is done when there is no cross-wind to affect the corrections being made. Then in operational step 1103 a first test shot is fired with the device 100 vertical (no tilt) and aimed such that the crosshairs are centered on the target image. In operation 1104 the bullet impact deviation from target center is measured and recorded. In operation 1105 a second test shot is made and in operation 1106 the bullet impact deviation from target center is recorded. These test shots are repeated several times in operation 1107. In operation 1108, all of these recorded deviation values are entered into the software to generate mechanical Elevation and Windage correction values for the apparatus 100 on the particular weapon. Finally, in operation 1109, the software determined Elevation and Windage correction values for the apparatus 100 are downloaded to the scope device 100 via its USB port.

In order to provide proper muzzle velocity (MV) and ballistics coefficient (BC) data that is tailored to the weapon, additional test firings at various distances are required. These operations are explained with reference to FIG. 20. These steps are the same as in FIG. 19 through step 1208. In operation 1209 the previous steps are repeated for several different target distances. The deviations are then entered in software in operation 1210 to generate a best fit of the data and produce accurate muzzle velocity and ballistics coefficient data for the particular cartridge being fired in the weapon. These values are then downloaded into the device 100 in operation 1211.

The software code utilized to generate the MV and BC data is based on Newtonian physics equations for projectiles that are well known. Exemplary equations for this purpose may be found in Modern Practical Ballistics, by Arthur J. Pejsa, Kenwood Publishing, 2nd edition. Once these values of MV and BC are known for a particular weapon/targeting device combination, and downloaded into the image processor 104, operation of the device 100 is straightforward.

In operation, the user of the device 100 simply aims the weapon at a target, tilts the weapon more than 10 degrees counterclockwise to visually zoom in on the target, then, when appropriately sized in the display, return the weapon to vertical and tilts the weapon either slightly left or right, depending on the perceived cross-wind, and takes the shot. Range is corrected automatically via the microprocessor shifting the display image up or down. The crosshairs remain centered and the range correction is automatically provided and displayed. Cross-windage correction is automatically made by the shooter tilting the weapon to his or her estimate of the desired target offset provided by the cross-wind correction symbol 203 in the image display shown in FIG. 2. The target image is automatically shifted right or left in the display so that the crosshairs remain centered and the shooter aims at the displayed image with the crosshairs centered and takes the shot while maintaining the tilt desired, thus correcting for cross-winds.

Figure 3:
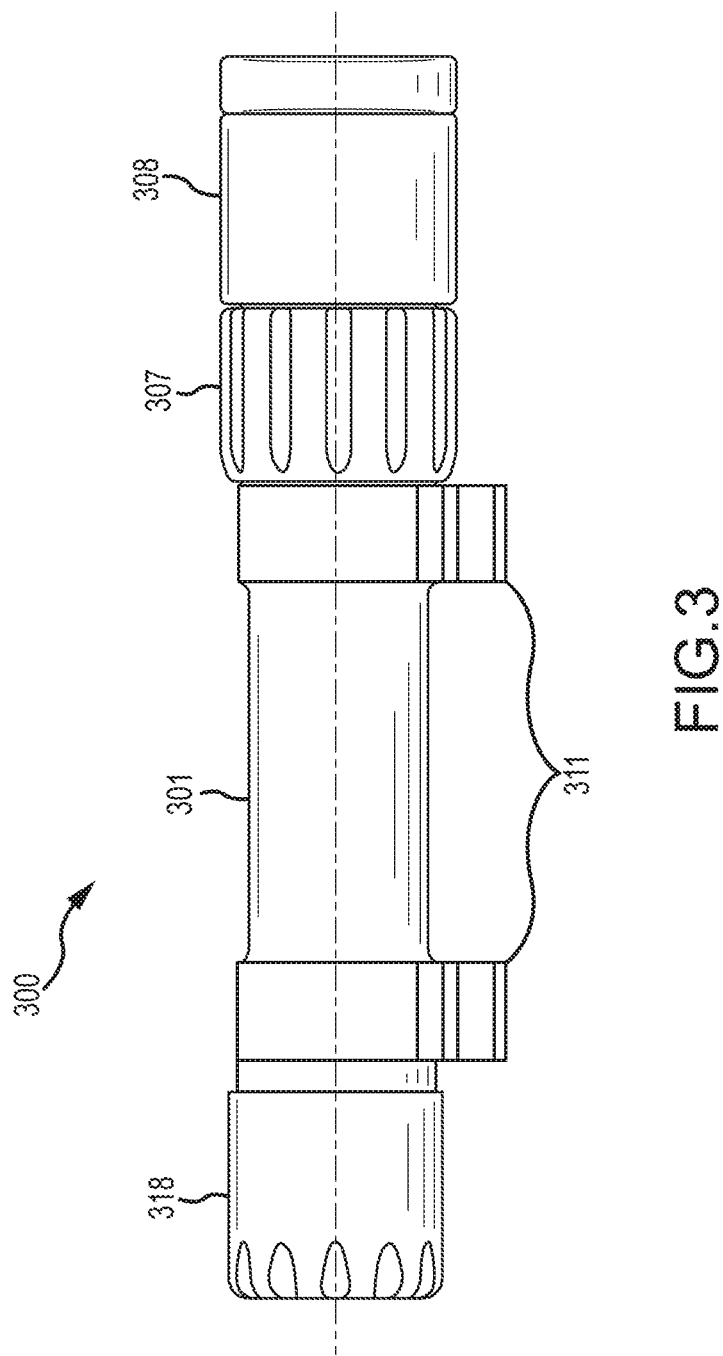
FIG. 3 is a side view of another embodiment of a digital targeting scope in accordance with the present disclosure.
Figure 4:
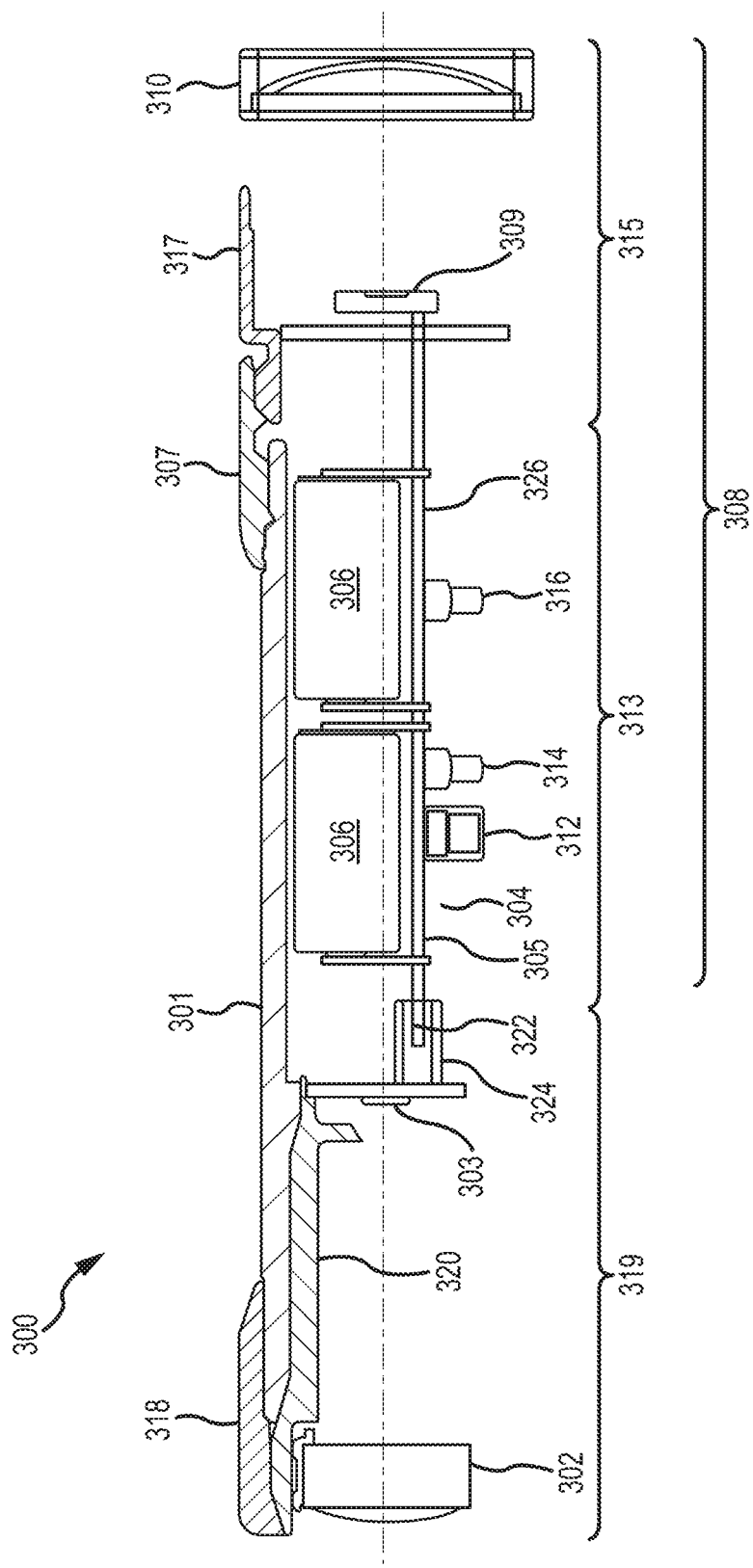
FIG. 4 is a partial, cross-sectional, schematic view of the digital targeting scope of FIG. 3.
Figure 5:
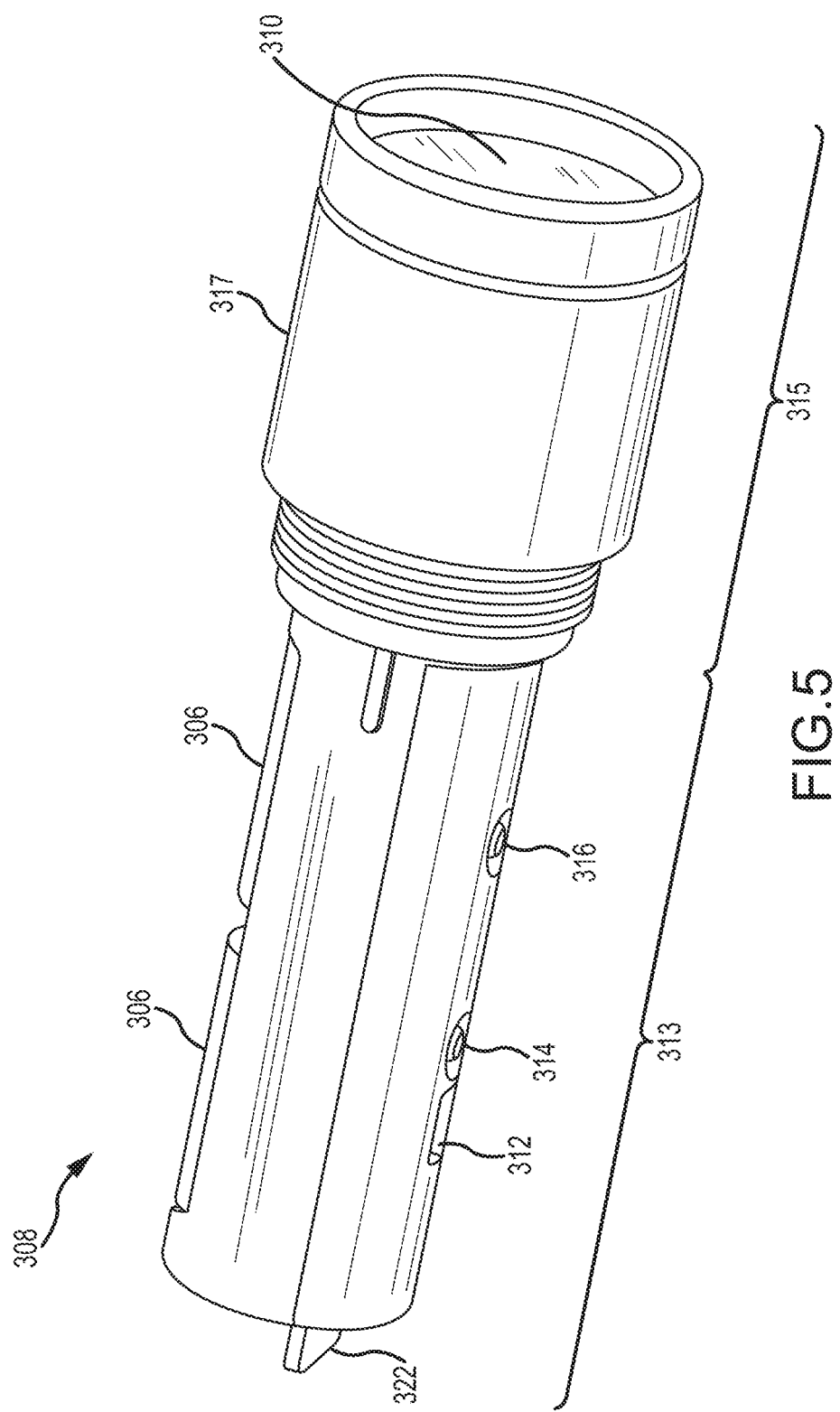
FIG. 5 is a separate perspective view a control/display module of the digital targeting scope of FIG. 3.
Figure 6:
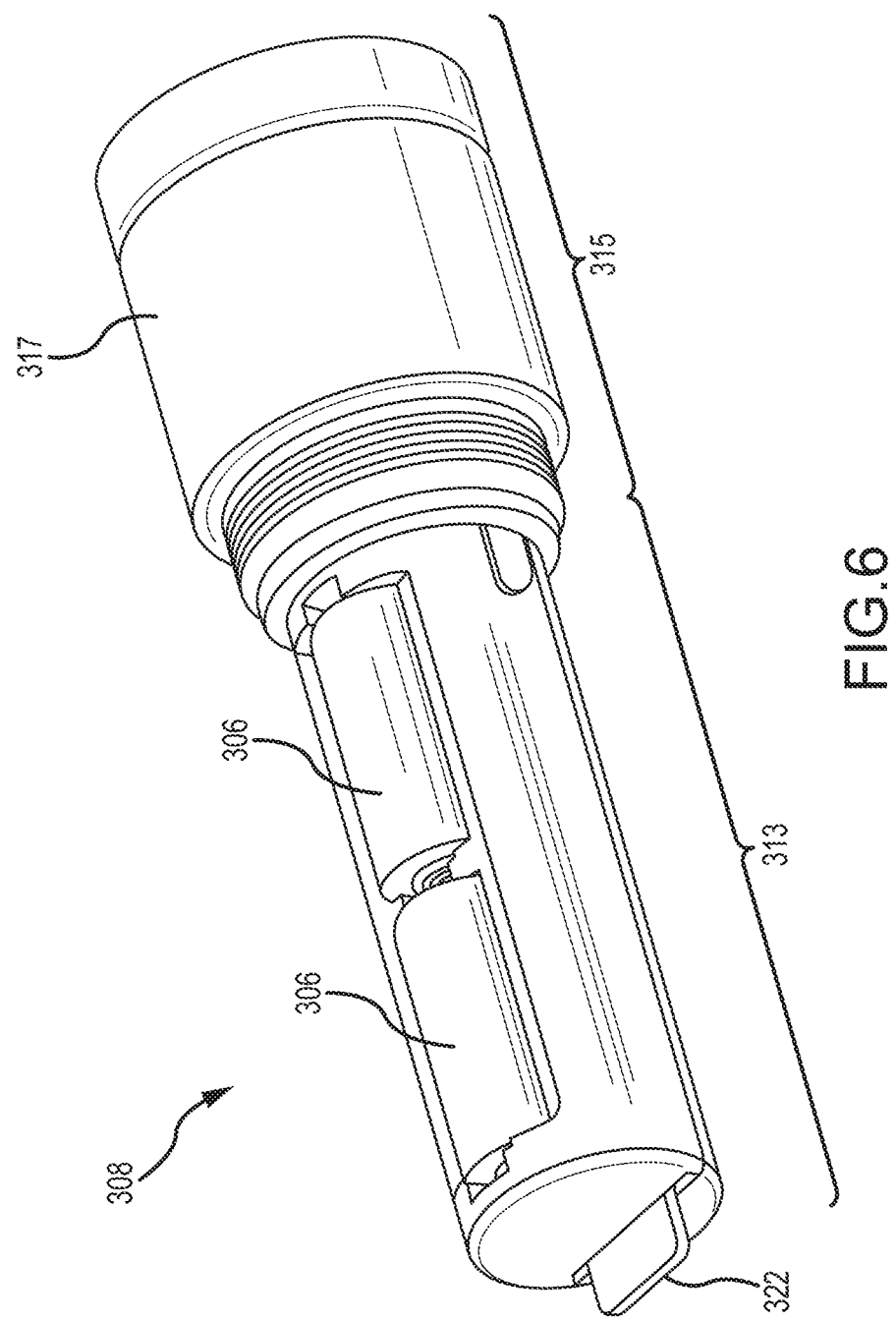
FIG. 6 is another perspective view of the control/display module as shown in FIG. 5.
Figure 7:
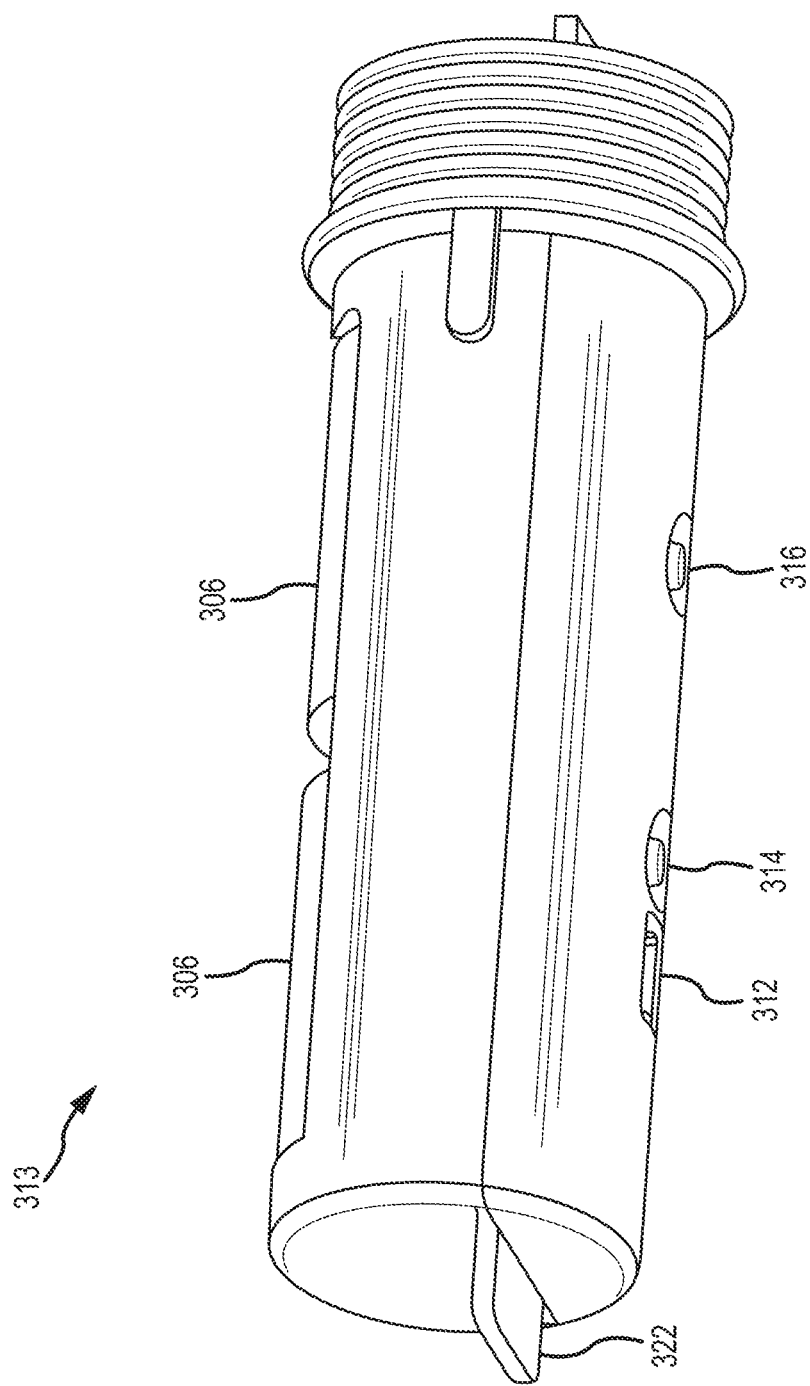
FIG. 7 is a separate perspective view of the control portion of the control/display module of FIG. 6.

Referring now to FIGS. 3-4, a second embodiment of an aiming device 300 is illustrated. In the illustrated embodiment, the apparatus 300 includes an elongated, hollow, tubular housing 301 having a front end and rear end. The housing may be fabricated from anodized aluminum or the like. A front lens 302 and an image sensor 303 are mounted in a sealed unit together proximal the front end of the housing 301. The front lens 302 is mounted so as to focus light from a target onto the image sensor 303. The front lens 302 and sensor 303 are part of a sealed interchangeable camera module 319. This image sensor 303 is mounted on a circuit board and preferably includes a sensor, an image processor and nonvolatile memory.

A microprocessor 304, pressure and temperature sensors (not shown), a tilt sensor 305, and batteries 306 are mounted to a circuit board 326 in a control/display module 308. The image sensor 303, temperature, pressure, and tilt sensor 305 are in electrical communication with the microprocessor 304 as described below.

The control/display module 308 and an image display component 309 are removably mounted proximal the rear end of the housing 301. The image display component 309 is in electrical communication with the microprocessor 304. The housing 301 also includes an integral mounting system 311 for the purpose of mounting the aiming device 300 to a weapon (e.g., a rifle).

The aiming device 300 may include some or all of the features of the first embodiment of the aiming device 100 including, for example, such features as field of view adjustment, bullet drop (range) correction, and/or cross-windage correction. In addition, the aiming device 300 preferably includes interchangeable camera modules 319 consisting of the front lens 302 and image sensor 303 in a lens barrel 320. The image sensor 303 is mounted normal to the lens axis on a circuit board fastened to a rear end of the barrel 320 and is preferably sealed thereto. The image sensor circuit board includes a coaxially rearwardly extending female connector 324 for receiving a blade pin connector extending from the forward end of the control/display module 308 described below.

Figure 9:
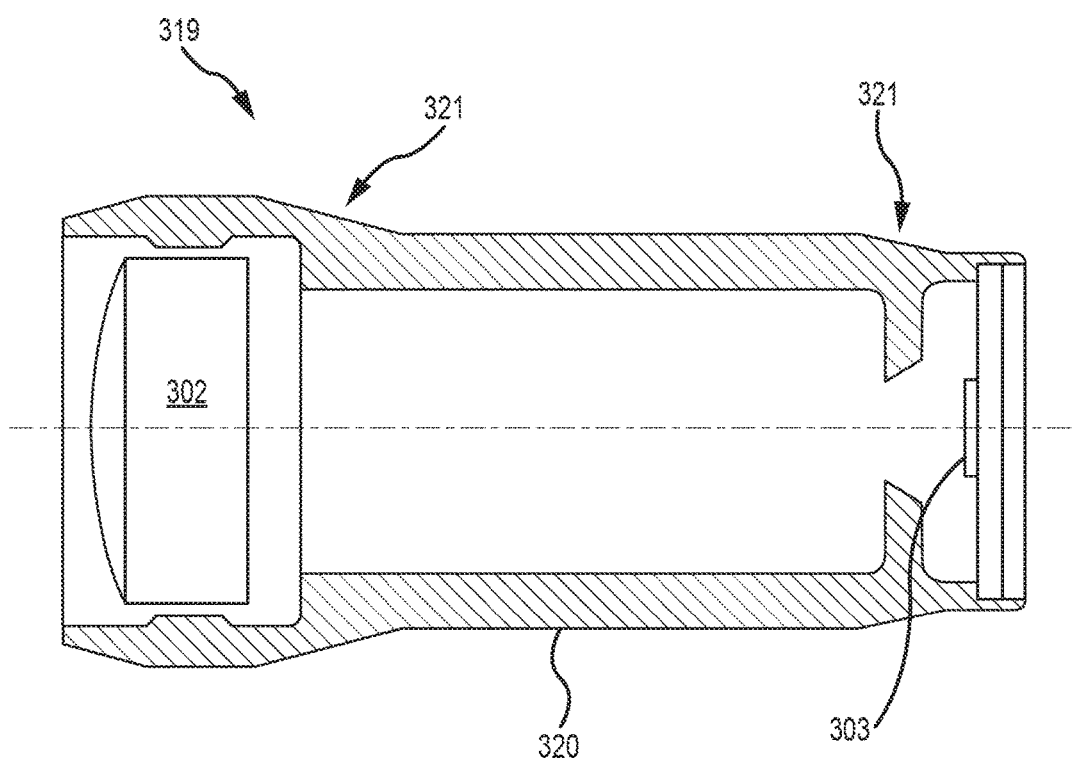
FIG. 9 is a separate, cross-sectional, schematic view of an interchangeable camera module of the embodiment of the digital targeting scope shown in FIG. 3.

The camera modules 319 are secured to the housing 301 via an external threaded collar 318 that guides and securely seats the lens barrel 320 in exact registry within the housing 301, via registration surfaces 321 (shown in FIG. 9). This interchangeable camera module feature permits one targeting apparatus or device 300 to be utilized in a variety of different circumstances such as long range or short range situations without the need to re-sight in a different camera module 319. This can be very advantageous to a user.

Referring now to FIGS. 5-8, one embodiment of a removable control/display module 308 is illustrated. The control/display module 308 is removably mounted to the rear end of the elongated tubular housing 301 by a collar 307. Removal of the control/display module 308 from the tubular housing 301 may facilitate battery replacement and/or facilitate configuration of device settings, as described below. The collar 307 may employ bayonet type, threaded, or any other suitable mounting system that can maintain mechanical connection between control/display module 308 and the tubular housing 301 during the firing of the weapon.

The front opening of the collar 307 fits over the outer surface of the rear end of the tubular housing 301. The outer surface of the rear end of the tubular housing 301, in this exemplary embodiment, includes an annular groove. The inner surface of the collar 307 includes a annular rib configured to fit within the groove such that the collar 307 is rotatably mounted to the tubular housing 301. The inner surface of the rear opening of the collar 307 is threaded. The outer surface of the front end of the control/display module 308 is similarly threaded such that the control/display module 308 may be threadably mounted to the tubular housing 301 via rotation of the collar 307. Thus, the collar 307 allows the control/display module 308 to be connected and disconnected to the tubular housing 301 without rotation of the control/display module 308 in relation to the tubular housing 301. This, in turn, allows for use of plug or bayonet type electrical connections between the control/display module 308 and the camera module 319.

The control/display module 308 includes an eyepiece lens assembly 310. The eyepiece lens assembly 310 facilitates viewing of the image display component 309. In one embodiment, the distance from the eyepiece lens in the eyepiece lens assembly 310 to the image display component 309 may be manually adjustable to facilitate diopter adjustment. For example, the eyepiece lens assembly 310 may be threadably mounted in the control/display module 308 such that clockwise rotation of the eyepiece lens assembly 310 causes the distance from the eyepiece lens to the image display component 309 to decrease, and vice versa.

Figure 8:
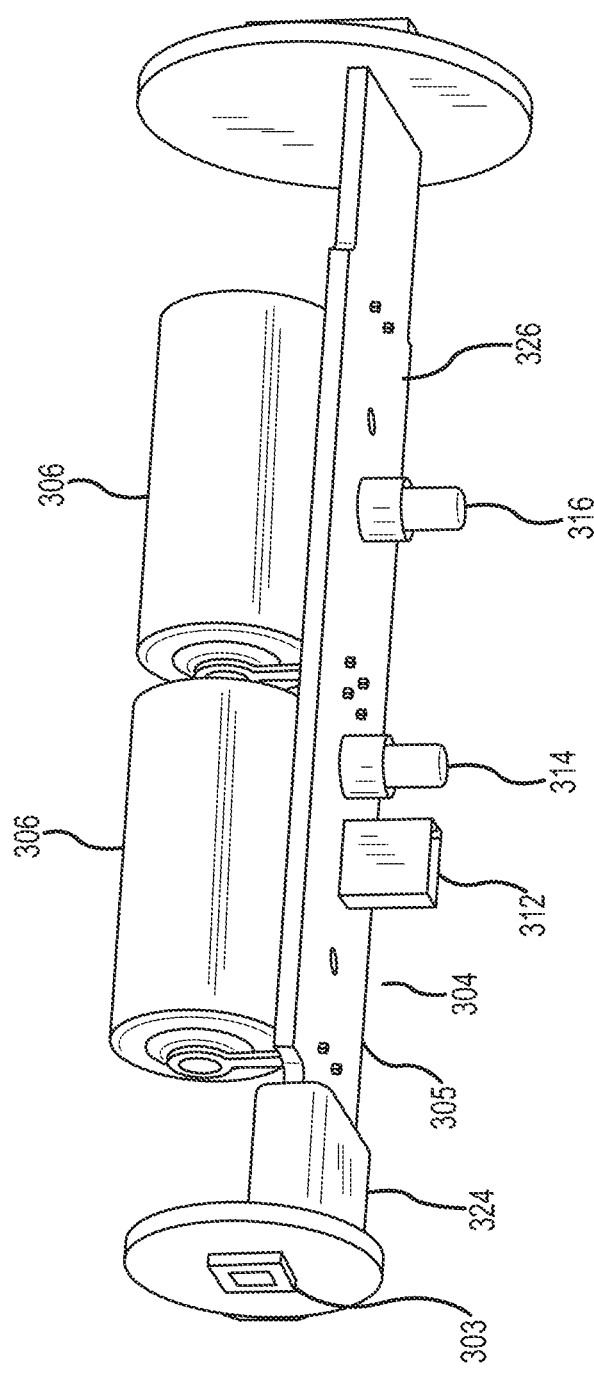
FIG. 8 is a perspective view of the control portion of the control/display module of FIG. 6, showing the sensor circuit board connected to the control portion.

As is best shown in FIG. 8, the control/display module includes control portion 313 that contains a circuit board 326 to which the batteries 306, a tilt sensor, a pressure sensor, and a temperature sensor are attached and which connect with the microprocessor 304 which in turn connects to the display element 309 in the display portion 315 of the control/display module 308. The front end of the circuit board 326 includes a male blade connector 322 that mates with the female connector 324 to solidly connect the image sensor 303 with the microprocessor 304 that is mounted on the circuit board 326 when the control/display module 308 is installed within the housing 301 as above described.

Separation of the control/display module 308 from the tubular housing 301 allows the user to input information to be stored in electronic memory of the microprocessor 304. Such information may include ballistic data, for example ambient temperature, pressure, the muzzle velocity, drag, and/or ballistic coefficient associated with one or more bullet types. In the exemplary embodiment 300, removal of the control/display module 308 from the tubular housing 301, exposes a computer connection port 312 that is in electronic connection with the processor 304 via circuit board 326. In one embodiment, the computer connection port 312 is a USB port. The control/display module 308 may thus be connected to a computer having appropriate application software capable of communicating with the processor 304, via computer connection port 312. Ballistic data for one or more bullet cartridge types may then be input and stored in the aiming device 300 for use related to in-the-field bullet trajectory calculations by processor 304 to facilitate aiming of the weapon as described above.

Turning now to FIG. 9, one embodiment of an interchangeable lens module 319 is shown. In the illustrated embodiment, the lens module includes lens barrel 320 having registration surfaces 321. The registration surfaces 321 facilitate proper alignment of the interchangeable lens module 319 in the housing 301. As noted above, the image sensor 303 preferably includes nonvolatile memory. The nonvolatile memory stores the coordinates (x,y) of the pixel within the array of pixels of the image sensor 303 that lies along the line of sight of the camera module 319 (referred to herein as the "reference pixel"). When the interchangeable lens module 319 is installed in the apparatus 300, the microprocessor 304 may be operable to read the coordinates of the reference pixel to establish a reference point on the target image. Thus, each of the interchangeable lens modules 319 that may be installed in the apparatus 300 is self-contained and sealed. Further, the variable characteristics described herein are not affected by changing of the camera modules 319.

Due to slight manufacturing defects (e.g., lens imperfections), this line of sight of the camera module 319 may not be exactly coincident with the longitudinal center axis of the camera module 319. Preferably, the reference pixel is determined as a final step in the process of manufacturing the lens module 319. To determine the reference pixel, the interchangeable lens module 319 may be connected to a calibration apparatus (not shown) that includes surfaces that mate with registration surfaces 321. The calibration apparatus further includes a calibration target positioned such that when the interchangeable lens module 319 is mounted in the calibration apparatus, the center axis of the lens module 319 is pointed at the calibration target. An image of the calibration target may then be obtained via the sensor 303. The reference pixel may then be located by analyzing the image to determine which pixel of the sensor 303 captured the light emanating from the center of the calibration target. The coordinates of the reference pixel may then be stored (e.g., "burned") in the nonvolatile memory of the image sensor 303 via the calibration apparatus.

Figure 10:
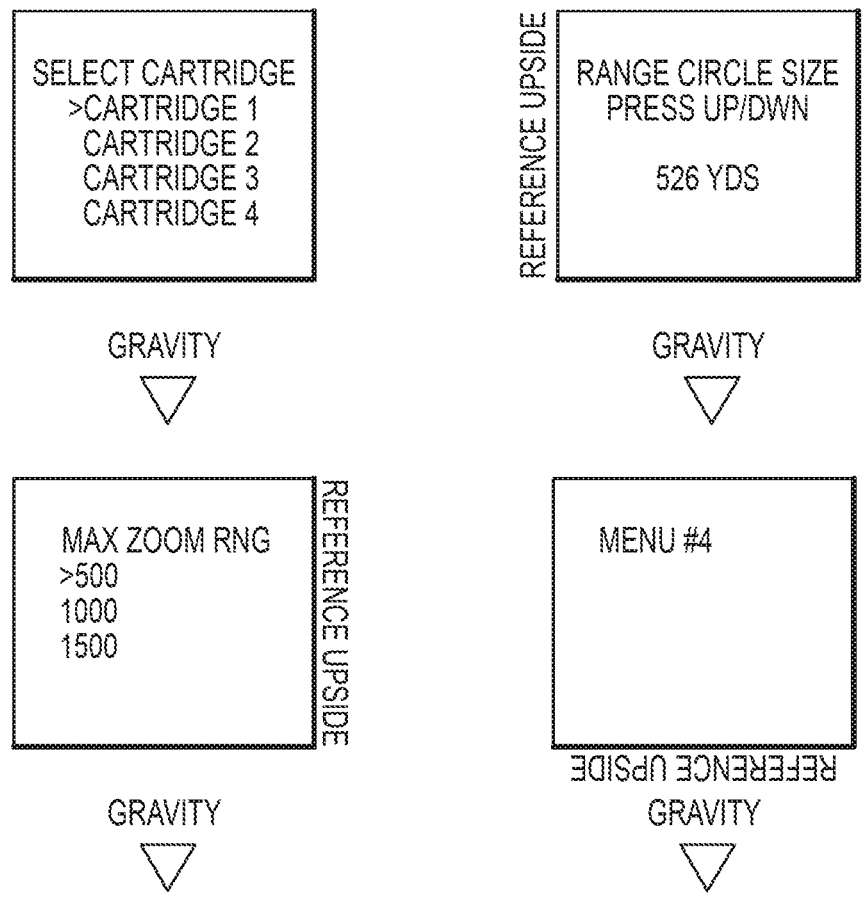
FIG. 10 illustrates four representative displays provided by the control/display module of the digital targeting scope of FIG. 3.

Referring now to FIG. 10, four exemplary menu displays provided by the control/display module of the digital targeting scope are illustrated. In one embodiment of the control/display module 308, separation of the control/display module 308 from the tubular housing 301 allows the user to make in-the-field selections of such functions as size of range circle 202, maximum zoom range and bullet type.

These functions are preferably organized into menus. For example, a cartridge menu may display several cartridge types. Changing the cartridge type on the menu causes the ballistic data, MV and BC values, used in trajectory calculations by the processor 304 to correspondingly change.

In one embodiment, the user may step through the various menus by changing the tilt angle of the separated control/display module 308. For example a first menu appears at a tilt angle of 0 degrees, a second menu appears at a tilt angle of 90 degrees, a third menu appears at a tilt angle of 180 degrees, and a fourth menu may be presented at a tilt angle of 270 degrees. The user may step through the various options within each menu via use of the push buttons 314, 316. Thus, the user may make in-the-field changes to such functions as size of range circle 202, maximum zoom range and ballistic data associated with one or more bullet cartridge types. In other embodiments, the eye sensor described above may be used to step through the menus. The eye sensor may register specific, deliberate movements of the eye and adjust the choices on the menu accordingly. For example, the eye sensor may register movement of the eye downward and direct a signal to the processor to highlight a menu choice below the previous menu choices. Eye movement to the left or right may select or deselect choices. A deliberate eye blink, e.g., having a duration longer than a predetermined time, may also be used to select or deselect an option. Actions taken by other eye movements are also contemplated.

Turning the aiming device 100 or 300 on is preferably accomplished by removing a front lens cover (not described) from the aiming device. Putting the aiming device in a low power standby state is accomplished by replacing a front lens cover on the aiming device. Naturally, removing the batteries will disable the device for storage, but will not erase static information stored in nonvolatile memory.

The technologies described herein may also be used in an aiming or optical device that displays a position of a projectile along its ballistic curve, as the zoom level increases or decreases. An exemplary condition is presented in FIG. 11. As described above, when a bullet travels from a rifle to an intended target, several forces affect the flight of the bullet. Gravity causes the bullet to drop in elevation as the bullet travels from the firearm to the target. If a hunter 500 is close to his/her target 502, the bullet drops very little. This trajectory is close to the optical path 504 at short distances. However, improvements in firearms and ammunition have allowed hunters to target game from long distances. At these greater distances, gravity causes a bullet to drop in elevation more significantly, as represented by the ballistic path 506 in FIG. 11. Other factors also affect the flight of the bullet. For instance, cross-wind causes the bullet to move horizontally along the bullet's path of flight. The compensation in an optical device for the effect wind has on a bullet's flight is often referred to as windage. Humidity, elevation, temperature, and other environmental factors may also affect the flight of the bullet.

To properly sight a target from a significant distance, typical optical devices (that is, optical devices that use a plurality of lenses along an optical path, without an image sensor) may be adjusted to increase magnification along the optical path of the device. That is, an increase in magnification increases the viewed size of a target, along a straight line between the aiming device and the target. However, to compensate for bullet drop, the user must adjust the position of a target within the viewfinder by lifting the firearm slightly, thereby aligning a different aiming element on the target, based on the range thereto. This extra step is often forgotten by novice (or even advanced) shooters who are rushed or distracted, resulting in an incorrect aim. This can lead to a missed shot, or worse, a non-lethal shot. In the so-called "ballistic zoom" technology described below, the aiming device displays a region about the projectile position at any given distance from the shooter, thus compelling the shooter to raise, lower, or otherwise adjust the position of the firearm to compensate for bullet drop or cross-wind.

Figure 11:
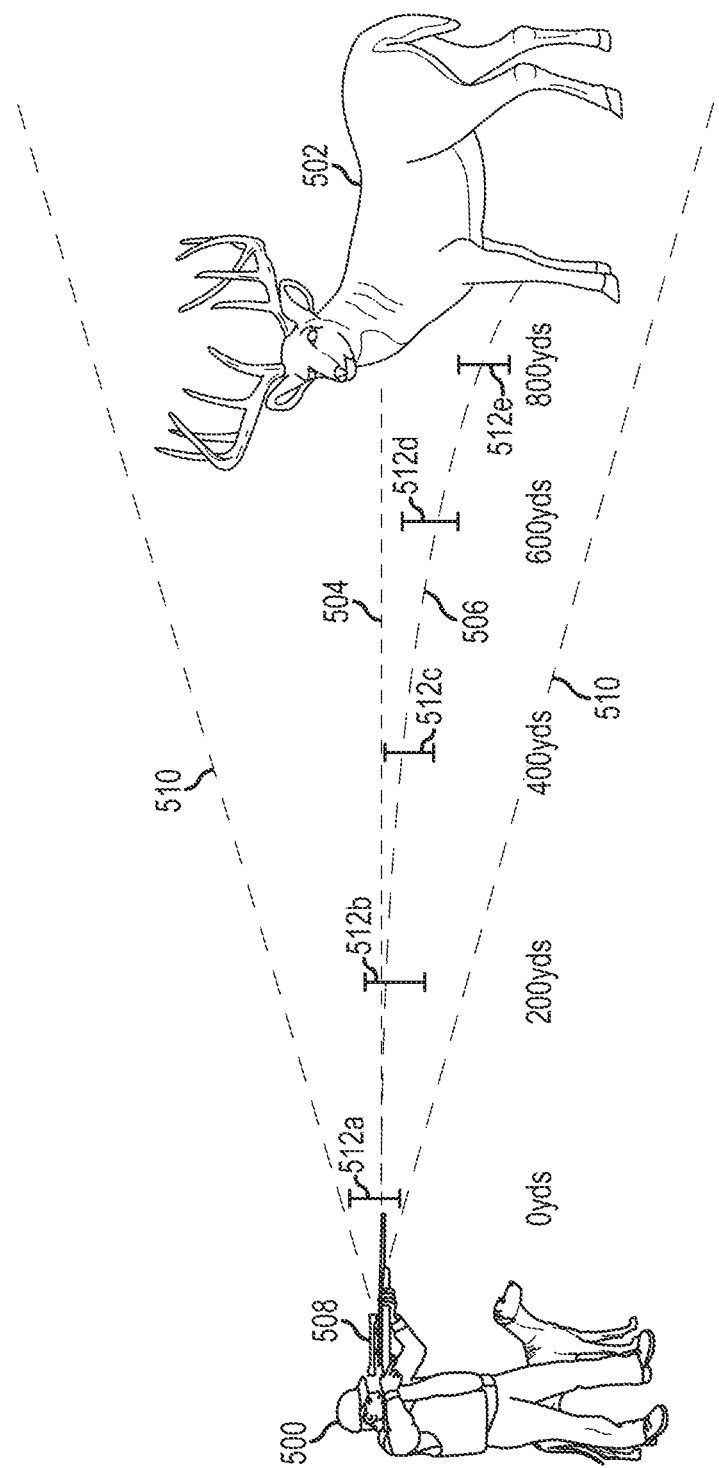
FIG. 11 is a simplified representation of the effect of gravity on the flight of a bullet.

The ballistic zoom technologies described herein differ from the prior art, in that the increase in magnification (or zoom) occurs along the ballistic path 506 of the bullet. For any known ballistic information (e.g., projectile caliber, muzzle velocity, cross-wind speed, etc.), the position of the projectile is known at any distance from the firearm. The technologies described herein zoom along this ballistic path 506, as depicted in FIG. 11. The aiming device 508 captures a field of view (FOV) (designated by lines 510). The aiming device 508 displays only a portion of the field of view 510 to the user, however. This displayed portion (also referred to as a region of interest (ROI)) is an area of the field of view around the position of the projectile. Multiple regions of interest 512 are depicted in FIG. 11. For example, at zero yards from the aiming device 512a is the area around the projectile at that point in space. Regions of interest are depicted at 200 yards (512b), 400 yards (512b), 600 yards (512c) and 800 yards (512d). A zoom value (described further below) is associated with a ballistic curve, thus allowing the aiming device 508 to determine the magnification for a given range and vice versa. The displayed regions of interest 512 may be any area as required or desired for a particular application. As the bullet drops off along the ballistic path 506, the hunter 500 is compelled to raise the firearm to keep the displayed aiming element positioned properly on the target 502.

Figure 12C:
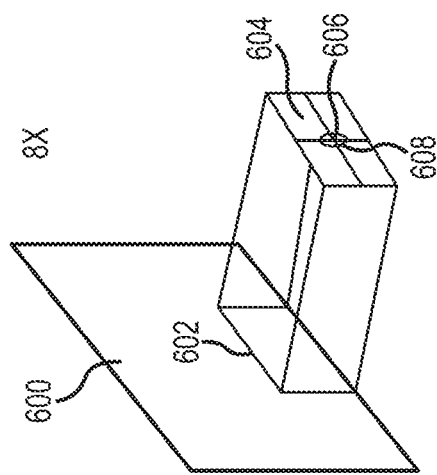
FIGS. 12A-12C depict comparisons between captured field of view versus displayed view for an aiming device using ballistic zoom technology.
Figure 12B:
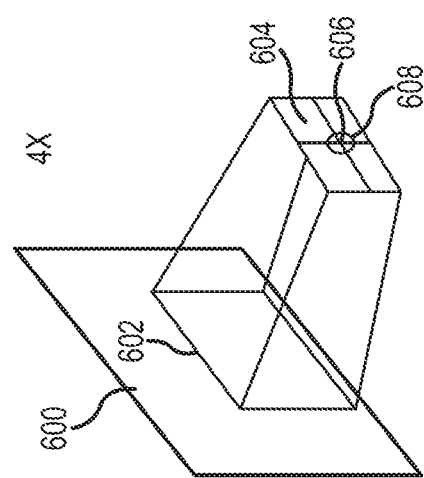
Figure 12A:
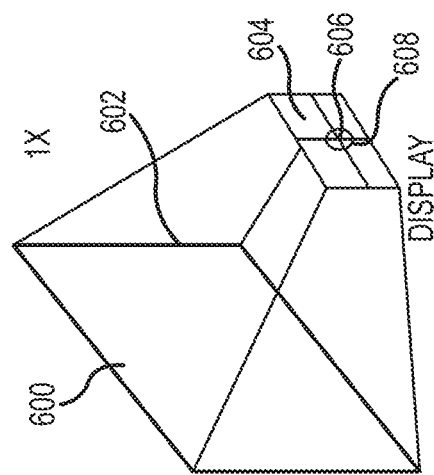

FIGS. 12A-12C depict comparisons between captured field of view versus displayed view for an aiming device using ballistic zoom technology at various zoom levels. Image inversions caused by the use of lenses within the aiming device are not depicted. FIG. 12A depicts an image 600 captured by an image sensor, such as a camera. Typically, this image 600 is the full FOV of the sensor. The ROI 602 is presented to a shooter as a displayed image 604 on a display. In this figure, the ROI 602 is the entire captured image 600. An aiming element 606, such as crosshairs, is superimposed on the displayed image 604. The crosshairs 606 indicate where the bullet will be located at a particular distance from the aiming device, where that particular distance is associated with a zoom level of the aiming device. A ranging element 608, in this case in the form of a range circle, is also superimposed on the displayed image 604.

At all zoom levels up to and including the maximum zoom level, the displayed size of the ranging element 608 is the same size with respect to the FOV 600 and is calibrated to a known target size. Thus, when using a ranging element calibrated to a six-foot target, once the target is "fit" within the ranging element (by increasing magnification), the aiming device is able to calculate the range to the target based on the Stadiametric method, as described above. Unlike prior art devices that increase magnification along the optical path, the ballistic zoom technology increases magnification along the ballistic path. Thus, since the ballistic path drops as distance away from the firearm increases, the displayed image 604 is derived from an ROI 602 on a lower portion of the FOV 600 as zoom level increases. For example, FIG. 12B depicts the relationship at 4x zoom level. Here, the captured image or FOV 600 is unchanged from FIG. 12A. The ROI 602 is smaller than the total FOV 600 and is disposed proximate a bottom region of the FOV 600. The ROI 602 is displayed as a displayed image 604. The size and position of the aiming element 606 and ranging element 608 remain unchanged on the display. FIG. 12C depicts the relationship at 8x zoom level. Again, the captured image or FOV 600 is unchanged from FIG. 12A. The ROI 602 is smaller than the total FOV 600 and is disposed at the bottom of the FOV 600. The sensor resolution may be scaled to the display resolution by pixel binning or other technologies known in the art. As the zoom increases power, a smaller and smaller ROI 602 is displayed. Additionally, since the magnification follows the ballistic path, the ROI 602 is always centered at the bullet position for that particular zoom level and associated range. This helps ensure an accurate shot at distance.

Figure 13A:
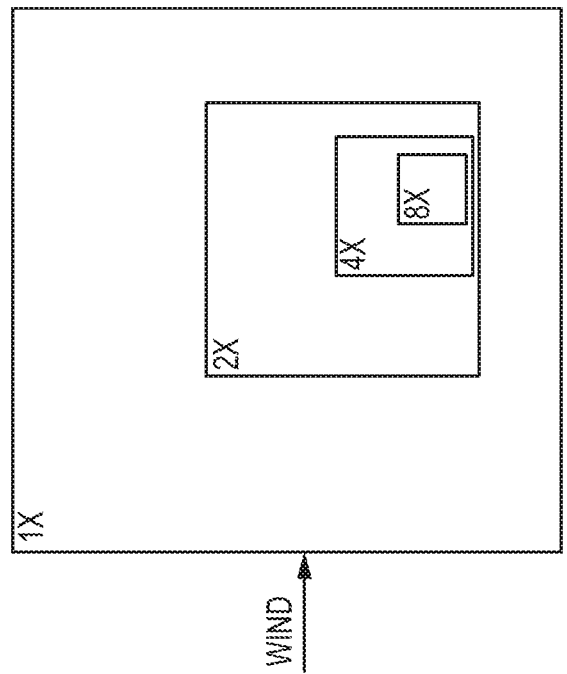
FIG. 13A depicts a region of interest for various magnifications of a traditional optical zoom system.

FIG. 13A depicts a region of interest for various magnifications of a traditional optical zoom system. In a traditional zoom system, the magnification is centered on the FOV, and the ROI corresponds to a centrally located portion of the FOV. Thus at greater and greater distances, the user must align different aiming elements with the target to ensure an accurate shot. Additionally, in view of the depicted cross-wind, the user must also utilize windage aiming elements to compensate for the crosswind. In this case, the user must aim the firearm to the left, to compensate for the crosswind moving towards the right.

Figure 13B:
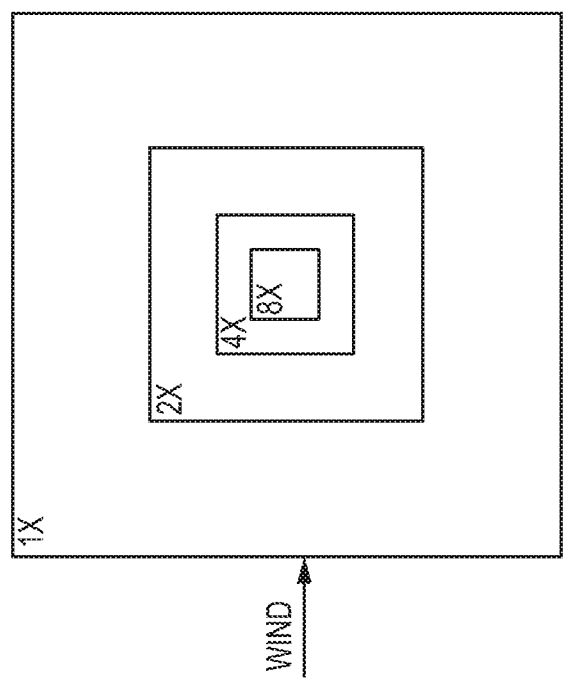
FIG. 13B depicts a region of interest for various magnifications of a ballistic zoom system in accordance with one embodiment of the present disclosure.

In contrast, FIG. 13B depicts a region of interest for various magnifications of a ballistic zoom system. Here, the center of the ROI follows the bullet ballistic curve such that at every level of zoom, the bullet position is centered in the ROI. As the zoom level increases, the center of the ROI moves down according to the calculated bullet drop and moves horizontally according to the calculated bullet drift due to crosswind. This compels the user to center the single available aiming point on the target to easily obtain an accurate shot.

Figure 14:
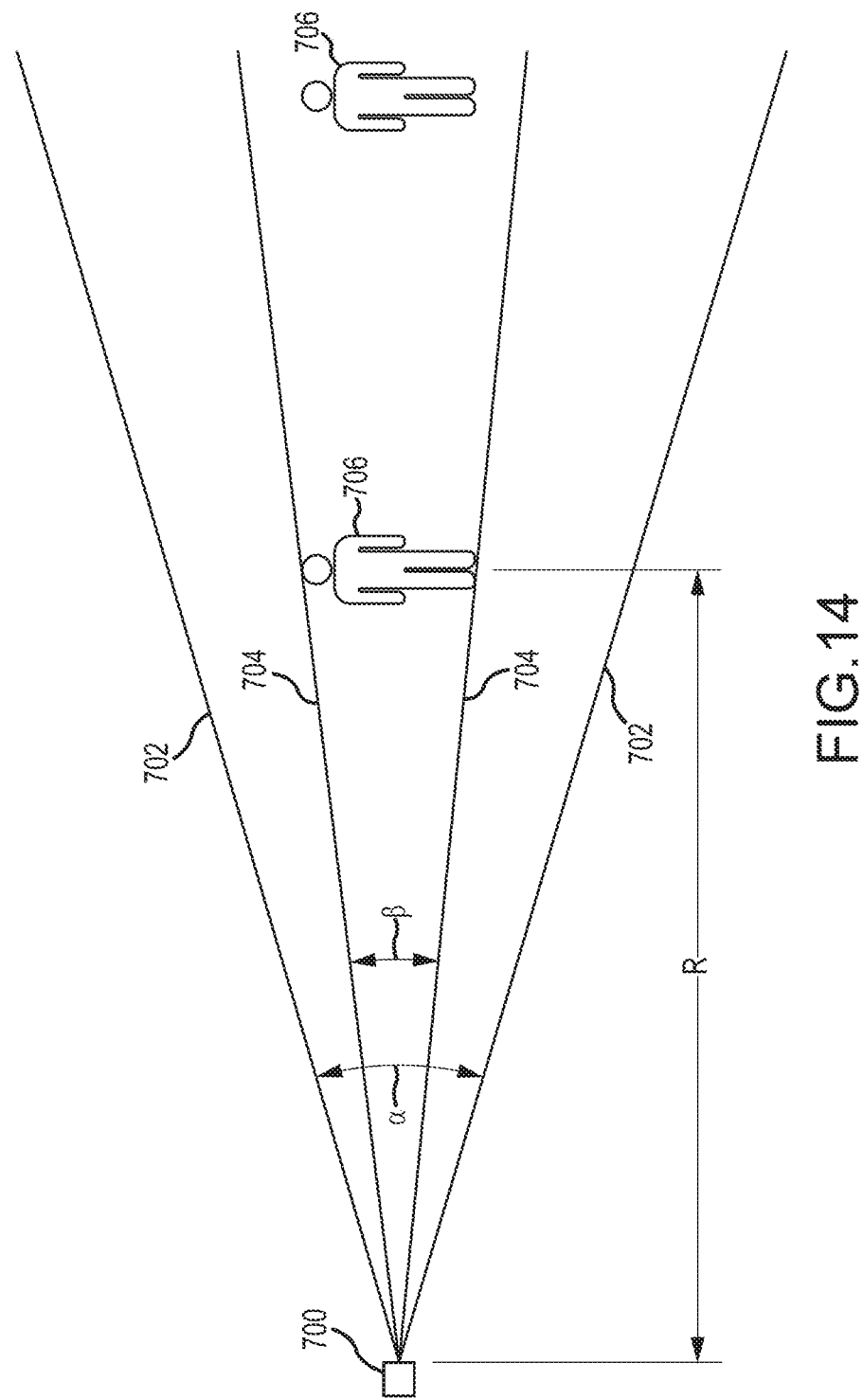
FIG. 14 depicts a relationship between a field of view and a fixed size ranging element.

FIG. 14 depicts a relationship between a field of view and a fixed size ranging element. An aiming device 700 is depicted having an FOV (defined by the outermost lines 702). The inner lines 704 depict a ranging element extent in relationship to the FOV 702. The FOV angle α is known at any zoom level. Consequently, the ranging element 704 subtends a known ranging element angle β at any zoom level. The user may select from ranging elements that are sized to a specific target 706 size. For example, the user may select a circle that corresponds a target of a particular size at a known distance (e.g., a six foot target for elk or other large game, or a three foot target for boar or smaller game). Since there is only a single range R in which the target 706 is exactly bracketed by the ranging element 704, the aiming device 700 is able to determine the range R based on the zoom level. The aiming device performs the calculation to determine the range R to the target 706. This range is used to calculate the ballistics and position the ROI. The range R may also be displayed, along with the zoom level, crosswind speed, or other information.

Figure 15:
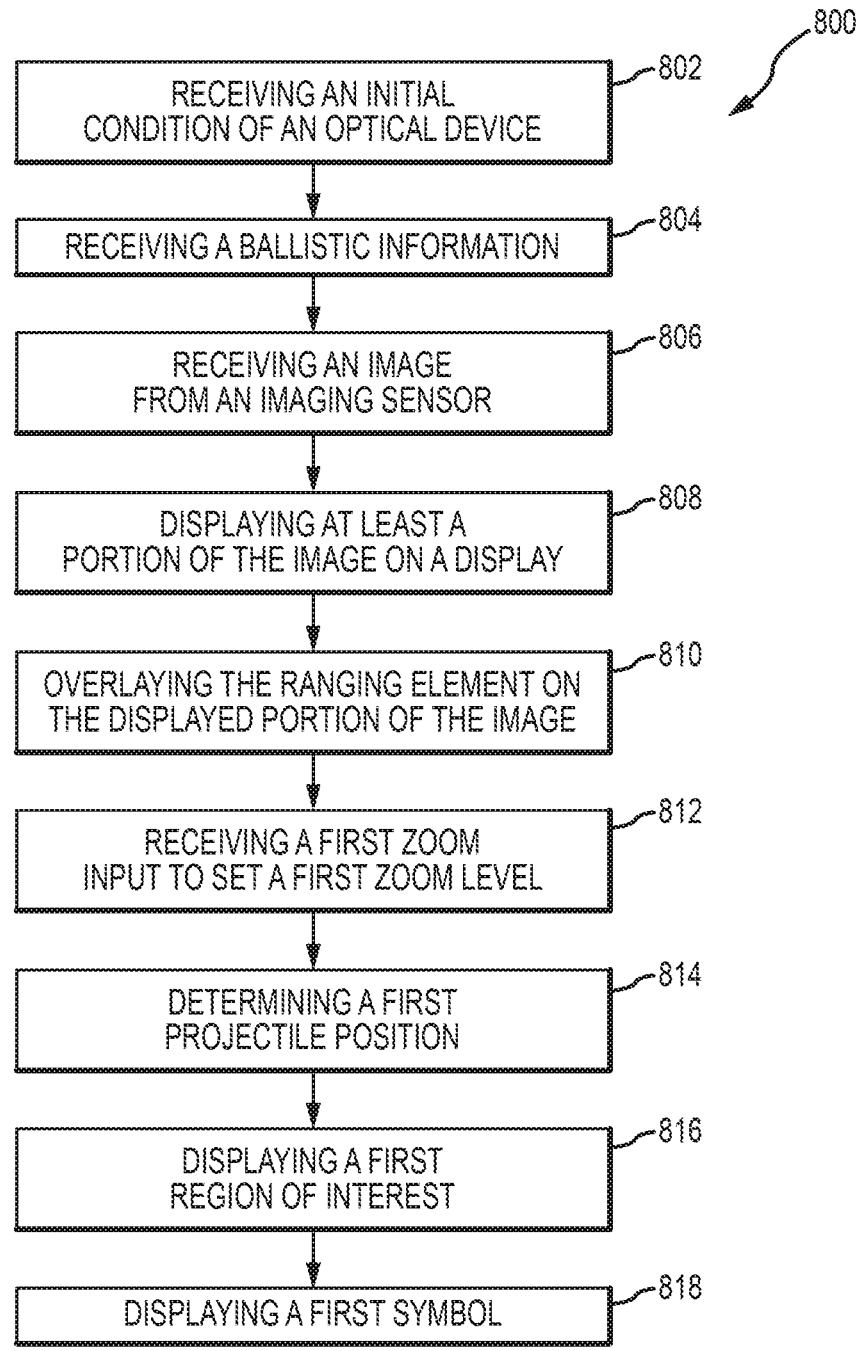
FIGS. 15-18 depict methods of sighting a target.

FIGS. 15-18 depict methods of sighting a target in accordance with several embodiments. FIG. 15 depicts a first method 800 of sighting a target with an aiming or optical device. The method 800 begins with operation 802 where an initial condition of an optical device is received. The initial condition may include a size of a ranging element as well as a range associated with the ranging element. For example, the ranging element may be based on a target of, say, six feet, and may be selected by the user, depending on the size of an expected target. The processor of the aiming device associates a known raging element with a known range, such that the range of a target that fits within the ranging element is known. Ballistic information, such as muzzle exit velocity, projectile weight or type, crosswind speed and direction, barometric pressure, inclination, tilt, ambient temperature, and other information, is received in operation 804. Typically, much of this information is programmed into a storage element of the aiming device prior to use, although crosswind speed is generally set during use. An image, generally, the FOV, is received by an image sensor in operation 806. At least a portion of this image, the ROI is displayed on a display to the user in operation 810. Thereafter, a first zoom input may be received in operation 812, and a first zoom level is set. This zoom level corresponds to a known distance from the aiming device. The zoom input may be based on an action taken on the part of the user, for example, actuation of a button or knob, tilting of the firearm, etc. As the aiming device increases in zoom level, the projectile position at that known distance (or zoom level), along with the associated ballistic information, is determined in operation 814. Based on the zoom value and projectile position, an ROI generally around the position of the projectile may be displayed, as in operation 816. Although the displayed crosshairs may be used for aiming, the aiming device may display a symbol such as an aiming element at the intersection of the crosshairs to further highlight the projectile position.

Figure 16:
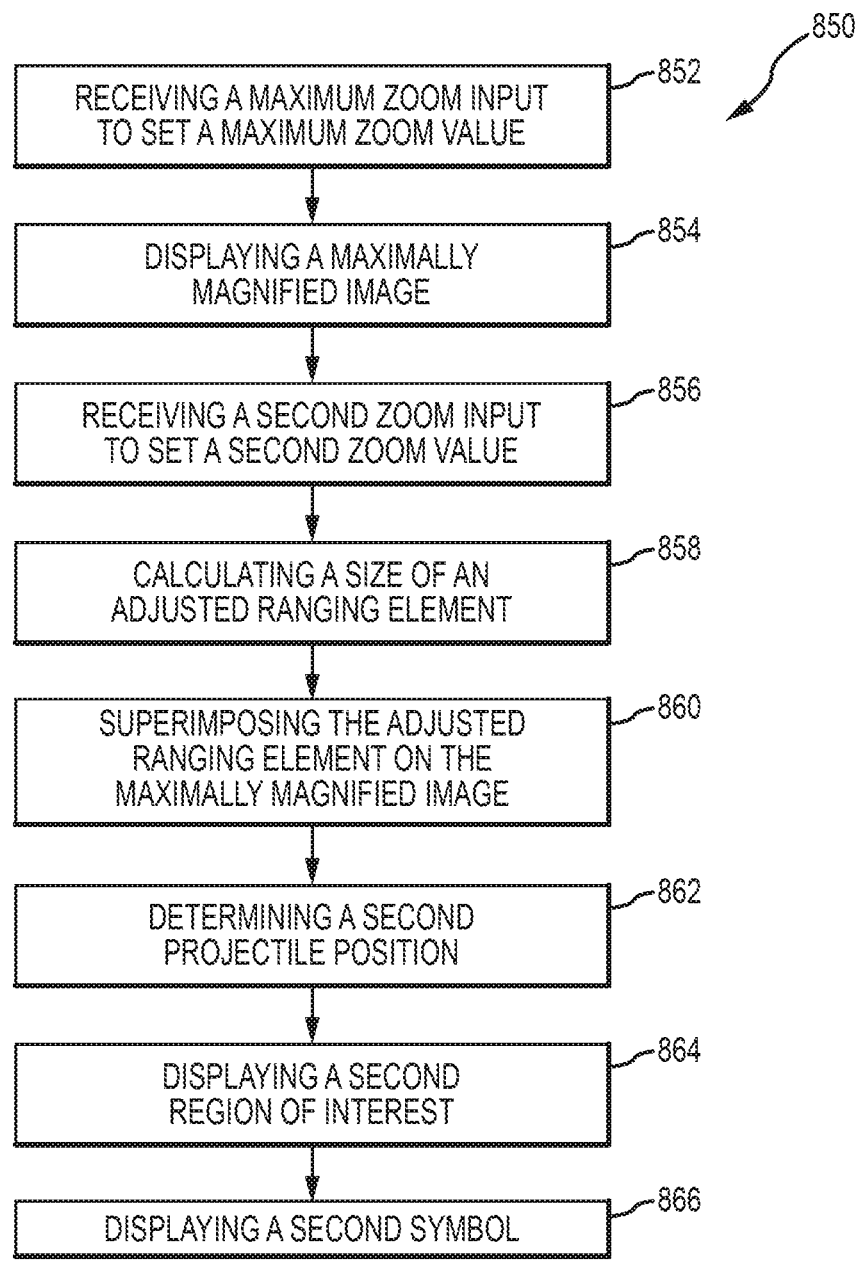
Figure 17:
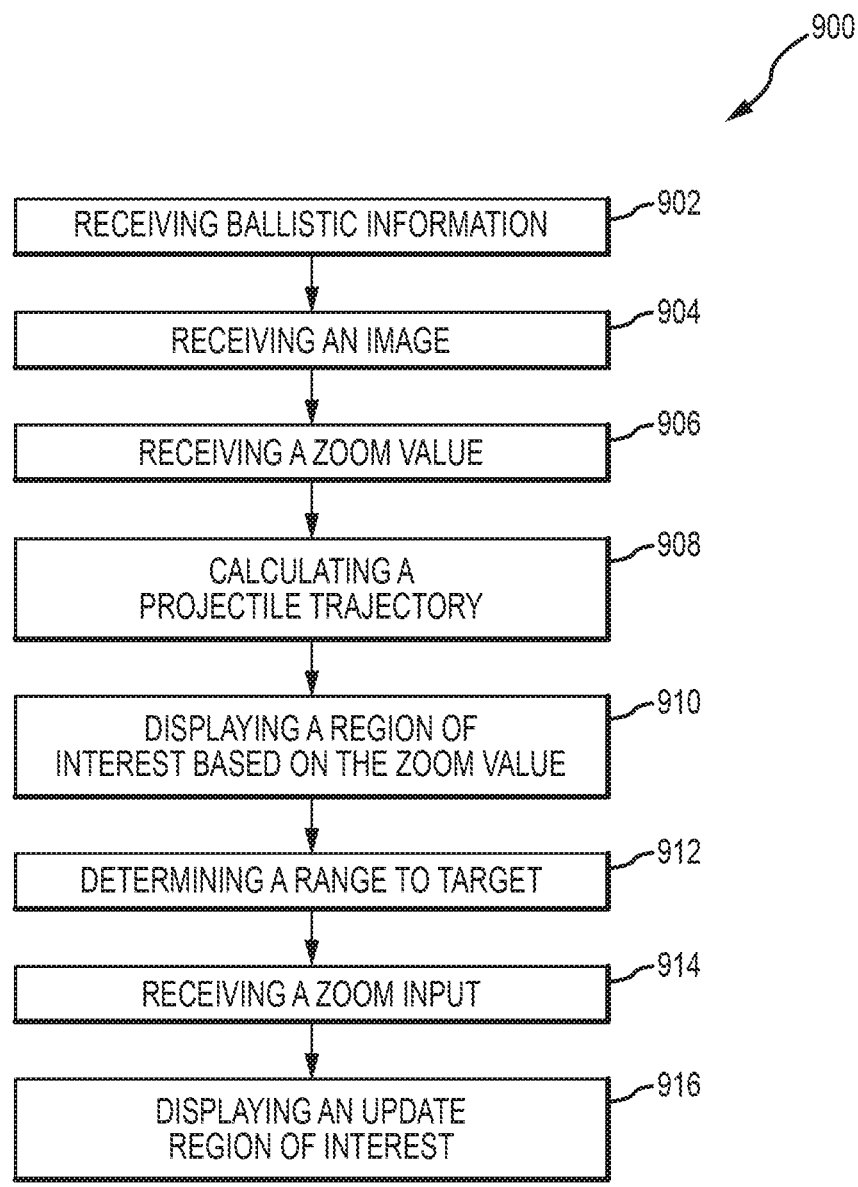

FIG. 16 depicts a method 850 of sighting a target once a maximum zoom level is of the imaging sensor is reached. Such a condition may occur if a target is extremely far from the aiming device user and the aiming device has reached its maximum zoom level after performing, e.g., the method 800 depicted in FIG. 15. The method 850 begins at operation 852 by receiving a maximum zoom input that sets a maximum zoom level. The maximum zoom level may be defined by an image sensor ROI and a displayed image, for example, once the resolution of the image sensor ROI meets the resolution of the displayed image. The maximally magnified image is displayed at operation 854. Thereafter, a second zoom input sets a second zoom value at operation 856. Unlike the method 800 described above, further zoom input after reaching a maximum zoom value reduces the displayed size of the ranging element. Based on the zoom input or zoom level, the size of the ranging element is calculated in operation 858. That adjusted ranging element is then superimposed on the maximally magnified image in operation 860. As the aiming device zoom input increases, the projectile position at that known distance (or zoom level), along with the associated ballistic information, is determined in operation 862. Based on the zoom value and projectile position, a region of interest generally around the position of the projectile may be displayed, as in operation 864. As in the method 800 of FIG. 15, the aiming device may display a symbol such as aiming element to further highlight the projectile position FIG. 17 depicts a method 900 of sighting a target. The method 500 includes receiving ballistic information, all or a portion of which may be stored in memory. An image is received from the image sensor in operation 904. A zoom value is received in operation 906 and a projectile trajectory is calculated in operation 908. As with the methods described above, an ROI based on the zoom value is displayed in operation 910. In general, the ROI corresponds at least in part to the projectile position. Although the displayed crosshairs may be used for aiming, the aiming device may display a symbol such as an aiming element at the crosshair intersection to further highlight the projectile position. By superimposing a ranging element on a portion of the displayed image, the range to the target may be determined in operation 912. Other methods of determining the range may also be utilized. Once a zoom input is received in operation 914, for example, by user actuation of a button, tilting of the aiming device, etc., an updated ROI may be displayed in operation 916.

Figure 18:
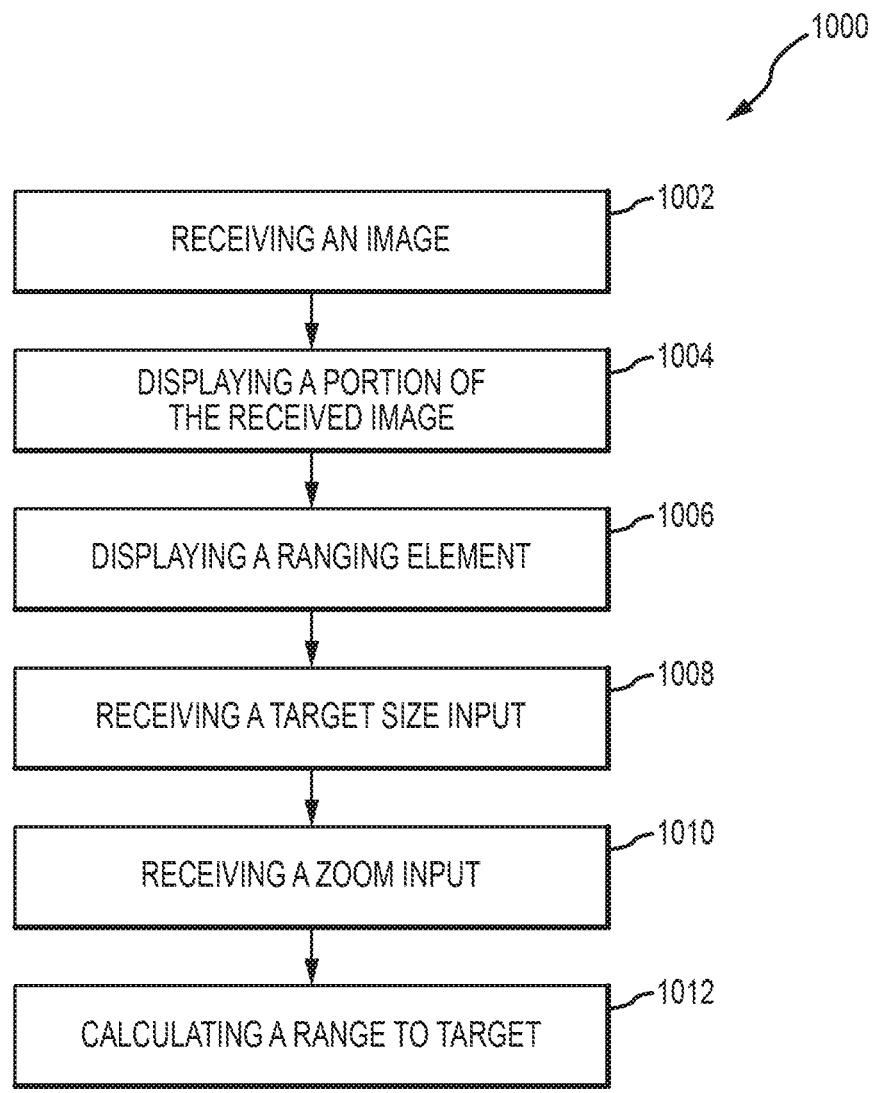

Another method 1000 of sighting a target is depicted in FIG. 18. Here, an image received by an image sensor such as a camera is received in operation 1002. A field of view that is a portion of the received image is displayed in operation 1004. A ranging element having a fixed size in relation to the displayed field of view is displayed or superimposed on the field of view in operation 1006. A target size input is received in operation 1008. This target size input may be a default target size input (for example, for six foot high targets) or the input may be received from a storage device. In other embodiments, the target size input is selected from a plurality of predetermined target sizes. A zoom input that sets a zoom value is received in operation 1010 and the range to target is then calculated in operation 1012.

The ballistic zoom technology described herein may be utilized for aiming devices that utilize image sensors such as cameras. In certain embodiments, use of ballistic zoom may be selected as an option, instead of the traditional or default zoom (that is, a zoom system where zoom level or magnification increases along the optical path) described above. Thus, a shooter may be able to change the zoom system (ballistic or traditional) as desired for a particular scenario, user preference, etc. In still other embodiments, an optical device setting may be selected where the crosshairs depicted, for example, in FIGS. 12A-12C are not associated with the projectile position. In such embodiments, the display may present one or more aiming elements, discrete from the crosshairs, that are associated with the projectile position at a given distance. The ROI may be centered on the aiming element in such embodiments.

Figure 20:
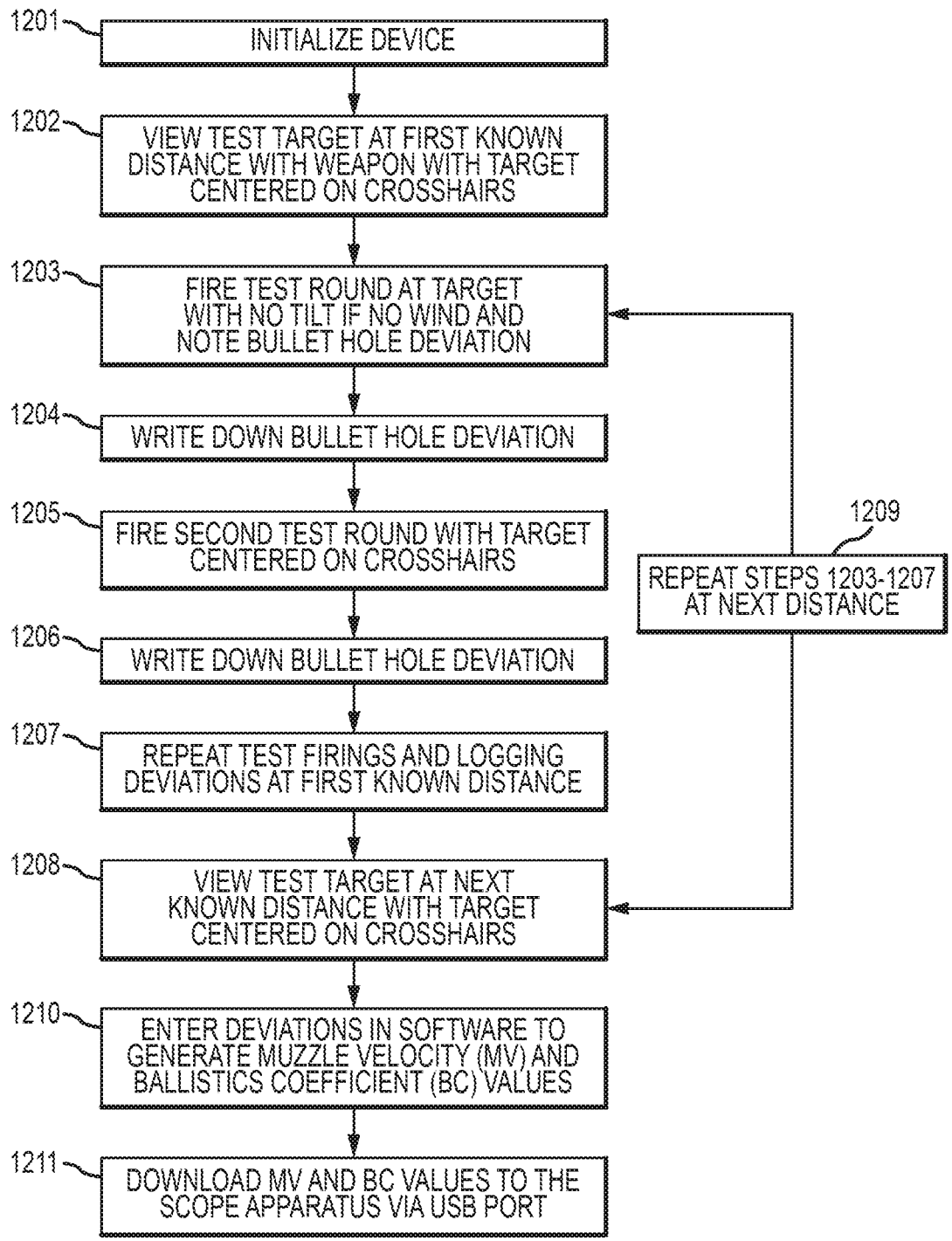
FIG. 20 illustrates the process of determining the muzzle velocity (MV) and ballistic characteristic (BC) values for the apparatuses shown in FIG. 1 and FIG. 3 on a specific weapon such as a rifle for various distances.

Referring now to FIGS. 19 and 20, the aiming device 300 may be sighted in for each of up to four types of cartridge/bullet combinations to be used in the weapon. In order to initially align the targeting apparatus 300 on a weapon such as a rifle, as with the first embodiment described above, first it must be mounted on the weapon and "sighted in" at a known distance. The sequence of operations is outlined in FIG. 19. This procedure is used to compensate the device for mechanical alignment variations with respect to the weapon barrel. A first vertical adjustment is called correction for mechanical "bullet drop" at a reference distance. Typically for a rifle this is done at a target distance of 100 yards. A second adjustment, to compensate for horizontal variation in mounting is called mechanical "windage". For the device 300, these adjustments are made in software resident on an external device such as a laptop, iPad, smartphone or PC that is then downloaded to the microprocessor 304 in the device 300 via USB port 312 on the Control/display module 308 when it is removed from the housing 301.

Initially, default values assuming perfect barrel alignment, and an expected muzzle velocity (MV) value and expected ballistic coefficient (BC) are loaded as defaults in the device 300, shown as operational step 1101 in FIG. 19. Next, the weapon is taken to a target range where a target is placed at a known distance, for example, 100 yards, and the device 300 is aimed at that target in operation 1102. Preferably this is done when there is no cross-wind to affect the corrections being made. Then in operational step 1103 a first test shot is fired with the device 300 held vertical (no tilt) and aimed basically horizontally such that the crosshairs are centered on the target image. In operation 1104 the bullet impact deviation from target center is measured and recorded. In operation 1105 a second test shot is made and in operation 1106 the bullet impact deviation from target center is recorded. These test shots are repeated several times in operation 1107. In operation 1108, all of these recorded deviation values are entered into the software to generate mechanical Elevation and Windage correction values for the apparatus 300 on the weapon. Finally, in operation 1109, the software determined Elevation and Windage correction values for the apparatus are downloaded to the scope device 300 via its USB port.

In order to provide proper muzzle velocity (MV) and ballistics coefficient (BC) data that is accurately tailored to the weapon, additional test firings at various distances are required. These operations are explained with reference to FIG. 20. These steps are the same as in FIG. 19 through step 1208. In operation 1209 the previous steps are repeated for several different distances. The deviations are then entered in software in operation 1210 to generate a best fit of the data and produce accurate muzzle velocity and ballistics coefficient data for the particular cartridge being fired in the weapon. These values are then downloaded into the device 300 in operation 1211.

This process as is described in reference to FIG. 20 must then repeated for up to 4 different cartridge load/bullet combinations, since the MV and BC values will be different for each combination. Once this process is completed, the device 300 will have "learned" the precise muzzle velocity and ballistic coefficients needed for accurate operation of the targeting apparatus 300. In order to perform accurate cross-windage correction calculations, we need to have range, tilt, MV, BC, and air density values. Range is manually set via tilting the apparatus 300 and weapon, e.g., greater than 10 degrees until the image of the target properly fills the image circle in the display. The gun is then reverted to less than 10 degrees, perhaps vertical if there is no cross-wind at the time of firing. If there is a cross-wind, the shooter simply tilts appropriately and re-aims according to the cross hairs 201 and the cross-wind correction symbol 203 in the displayed image, and takes the shot. Temperature and atmospheric pressure are both critical to accurate determination of air density.

It is important to note that when the control/display module 308 is installed within the housing 301, temperature and pressure values may no longer reflect accurately the environmental conditions. Hence the control/display module should not be installed until at the shooting site, or at least temporarily removed when arriving at the shooting site so that proper temperatures and pressures can be reflected. Upon arriving at the shooting site, the user may remove and reset the batteries 306 to reset the control/display module 308, thereby causing the pressure and temperature values to be measured and stored before the control/display module 308 is re-installed within the housing 301. Because of the contacts 322, when the control/display module is fully installed, both the sensor 303 and its microprocessor and the microprocessor 304 detects that the camera module 319 is connected and therefore knows to present video when the lens cover is removed.

In operation, the user of either of the devices 100 or 300 simply aims the weapon at a target, tilts the weapon more than 10 degrees counterclockwise to visually zoom in on the target, then, when appropriately sized in the display, return the weapon to vertical and tilts the weapon either slightly left or right, depending on the perceived cross-wind, and takes the shot. Range is corrected automatically via the microprocessor shifting the display image up or down appropriately for the bullet drop. The crosshairs remain centered and the range correction is automatically provided. Cross-windage correction is also automatically made by the shooter tilting the apparatus at an angle less than 10 degrees corresponding to an estimate of the cross wind, and aiming directly at the target in the crosshairs. This tilt causes the display image to shift right or left such that correct aim remains with the crosshairs centered. The cross-windage correction is shown by the indicator 203 in the image display shown in FIG. 2.

Thus, there is shown and described a unique design and concept of a digital aiming device. While this description is directed to particular embodiments, it is understood that those skilled in the art may conceive modifications and/or variations to the specific embodiments shown and described herein. Any such modifications or variations are intended to be included herein as well. It is understood that the description herein is intended to be illustrative only and is not intended to be limitative. Rather, the scope of the invention described herein is limited only by the claims appended hereto.

While there have been described herein what are to be considered exemplary and preferred embodiments of the present technology, other modifications of the technology will become apparent to those skilled in the art from the teachings herein. The particular methods of operation and manufacture and configurations disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An apparatus for sighting a target, the apparatus comprising:
a housing;
a display;
an imaging sensor; and
a controller configured to selectively operate the apparatus in a default zoom mode and a ballistic zoom mode, wherein when in the default zoom mode, an increase in a zoom level changes a field of view along an optical path from the apparatus to the target, and wherein when in the ballistic zoom mode, the increase in the zoom level changes the field of view along a ballistic path of a projectile to the target.

2. The apparatus of claim 1, wherein in the default zoom mode, a symbol associated with a projectile point of impact is displayed on the display, wherein a position of the symbol on the display changes based on the zoom level.

3. The apparatus of claim 1, wherein in the ballistic zoom mode, a symbol associated with a projectile point of impact is displayed on the display, wherein a position of the symbol on the display is fixed regardless of the zoom level.

4. The apparatus of claim 1, further comprising a ranging element disposed in the housing.

5. The apparatus of claim 1, further comprising at least one of a tilt sensor, a pressure sensor, and a temperature sensor, wherein the sensor is configured to send a signal to the controller.

6. The apparatus of claim 1, wherein the image sensor comprises a two-dimensional array of photosites.

7. The apparatus of claim 1, further comprising a camera module comprising a front lens and the image sensor, both disposed within a lens barrel.

8. The apparatus of claim 7, wherein the camera module is removable from the housing.

9. The apparatus of claim 1, further comprising a memory configured to store information, wherein the information comprises at least one of an ambient temperature, a pressure, a muzzle velocity, a drag coefficient, and a ballistic coefficient.

10. The apparatus of claim 9, wherein the memory is communicatively coupled to the controller.

11. The apparatus of claim 1, further comprising an adjustment element comprising at least one of a tilt sensor, a button, a switch, and a knob.

12. The apparatus of claim 1, further comprising a USB port in communication with the controller.

* * * * *